(12) United States Patent
Debrunner

(10) Patent No.: US 6,321,234 B1
(45) Date of Patent: Nov. 20, 2001

(54) DATABASE SERVER SYSTEM WITH IMPROVED METHODS FOR LOGGING TRANSACTIONS

(75) Inventor: Daniel Debrunner, Oakland, CA (US)

(73) Assignee: Sybase, Inc., Emeryville, CA (US)

( * ) Notice: Subject to any disclaimer, the term of this patent is extended or adjusted under 35 U.S.C. 154(b) by 0 days.

(21) Appl. No.: 08/744,870

(22) Filed: Nov. 8, 1996

Related U.S. Application Data

(60) Provisional application No. 60/026,286, filed on Sep. 18, 1996.

(51) Int. Cl.[7] .................................................. G06F 15/40
(52) U.S. Cl. .................................. 707/202; 707/6; 707/9; 709/101
(58) Field of Search .................................... 707/202, 203, 707/204, 2, 6, 9, 10, 7, 201; 709/100, 101

(56) References Cited

U.S. PATENT DOCUMENTS

| | | | | |
|---|---|---|---|---|
| 4,819,156 | * | 4/1989 | Delorme et al. | 364/200 |
| 5,287,501 | * | 2/1994 | Lomet | 395/600 |
| 5,455,946 | | 10/1995 | Mohan et al. | |
| 5,640,561 | * | 6/1997 | Satoh et al. | 395/618 |
| 5,713,018 | * | 1/1998 | Chan | 395/610 |
| 5,717,919 | * | 2/1998 | Kodavalla et al. | 395/608 |
| 5,721,918 | * | 2/1998 | Nilsson et al. | 395/618 |
| 5,812,996 | * | 9/1998 | Rubin et al. | 707/2 |

OTHER PUBLICATIONS

Gray, J. and Reuter, A., "Transaction Processing: Concepts and Techniques," Morgan Kaufmann Publishers, Inc., 1993, pp. 493–524.

C.J. Date "An Introduction to Database Systems"—Addison–Wesley Systems Programming Series, 1995.*
J. Davis, "Open systems: analysis, issues, & opinions" Open Information Systems, v10 n12 p18(7) Dec. 1995.*
Martin Rennhackkamp, "performance tuning" DBMS v9 n11 p85(5) Oct. 1996.*
George Anderson, "System 11: building and I/O Superhighway" Database Programming and Design v9 n6 p36(6) Jun. 1996.*
Sybase Inc., "Sybase sql server 11: performance optimized for real–world results" Oct. 1995.*
Molesky et al. "Recovery Protocols for Shared Memory Database Systems" Dept of Computer Science, 1995.*
Mohan "ARIES/CSA: A Method for Database Recovery in Client–Server Architecutres" 1994.*
Rosenblum et al. "The Impact of Architectural Trends on Operating Systems Performance" 1995.*

* cited by examiner

Primary Examiner—Majid A. Banankhah
(74) Attorney, Agent, or Firm—John A. Smart

(57) ABSTRACT

A SQL database server system having an enhanced logging system is described. The logging system implements a "private log cache" (PLC) for reducing the contention on the system's "log" resource (which is protected by a log semaphore). An area of memory private to a user's task is set aside as a PLC—a cache where log records are built and stored before being posted to the log. Each PLC may hold multiple log records for a single transaction before they are flushed to the log (page chain) through the log semaphore. When a transaction commits or the memory fills with log records, the PLC associated with the transaction is flushed to the log. Because the log records for a complete transaction are immediately transferred through the log semaphore, contention on the log semaphore decreases. Contention alleviated by the PLC dramatically increases transaction throughput of the database server system.

16 Claims, 24 Drawing Sheets

DATABASE SERVER SYSTEM WITH IMPROVED METHODS FOR LOGGING TRANSACTIONS

The present application claims priority from and is a continuation-in-part of provisional application Ser. No. 60/026,286, filed Sep. 18, 1996, the disclosure of which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to the process of logging transactions which are posted in a data processing system, such as a Database Management System (D)BMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level.

DBMS systems have long since moved from a centralized mainframe environment to a de-centralized or distributed environment. Today, one generally finds database systems implemented as one or more PC "client" systems, for instance, connected via a network to one or more server-based database systems (SQL database server). Commercial examples of these "client/server" systems include Powersoft™ clients connected to one or more Sybase SQL Server™ database servers. Both Powersoft™ and Sybase SQL Server™ are available from Sybase, Inc. of Emeryville, Calif. The general construction and operation of a database management system, including "client/server" relational database systems, is known in the art. See e.g., Date, C., *An Introduction to Database Systems,* Volume I and II, Addison Wesley, 1990; the disclosure of which is hereby incorporated by reference.

Traditionally, database management systems (e.g., the above-described client/server database systems) have been employed for on-line transaction processing (OLTP)—posting data from "transactions" to a database table. As part of this process, OLTP systems typically employ a logging system to log changes which occur to the system. In a commercial embodiment such as Sybase SQL Server System 11, this is done by costing log records to a transaction log. Every transactional operation, including inserts, updates, and deletes, causes a log record to be written to the transaction log or simply "log." In System 11, the transaction log is referred to as "syslogs." Each particular log record characterizes the change which has occurred to the database during processing of a transaction. This information can be used, for instance, in error recovery, to restore the database to a preexisting, consistent state.

Consider a scenario where a transaction performs updates to a table but then the transaction "rolls back"—that is, aborts. In such a case, the system will undo the updates by reading backwards from the log and reversing the changes which were made (as a result of the updates). The recovery system of databases, therefore, employs the logging system and log records when performing the work of rolling back a transaction. In a similar fashion, the log can be used in the face of a failure, such as when a machine "crashes." As the log is read during recovery, some transactions are re-done on the one hand, while incomplete transactions are undone on the other. In addition to rolling back transactions and supporting error recovery, the log also provides an archive for the database, which documents the specific actions which have led to the current state of the database. All told, the log plays a critical part in the design and implementation of present-day relational database systems.

The logging system itself permits reading from and writing to the log. Write access is typically performed by "access methods" within a relational database system (i.e., a database system which presents data as tables or "relations"). In particular, these methods generate log records which describe actions occurring which affect the database. Read access, on the other hand, is generally provided by a recovery system within the database. In general, therefore, database system includes subsystems for writing log records into the log and, if needed, reading back those records.

A general description of the design and implementation of a logging system in a relational database is provided by Gray, J. and Reuter, A., *Transaction Processing: Concepts and Techniques,* Morgan Kaufmann Publishers, 1993, the disclosure of which is hereby incorporated by reference. For an overview of relational database systems, see the above-mentioned *An Introduction to Database Systems,* the disclosure of which has been previously incorporated by reference.

Each day more and more businesses are run from mission-critical systems which store information on server-based SQL database systems, such as Sybase SQL Server™. As a result, increasingly higher demands are being placed on server-based SQL database systems to "scale" with increased hardware resources—that is, as more sophisticated hardware (e.g., multi-processor units) becomes available, these systems should provide greater throughput.

The logging system of a database system presents a bottleneck to system scalability, however. This is because every insert,update, and delete operation must make a log entry to protect the database from corruption if a system failure or transaction rollback occurs. Most relational databases process a log entry for each update, insert, or delete statement, and each log entry is processed one at a time. When a log entry is written, the logging system must navigate through a synchronization point called the "log semaphore," which controls concurrent access to the log by multiple database transactions.

Because every transaction involves the logging system, its efficiency is paramount to transaction throughput. As scalability increases in a database system and transaction volume increases, the contention for logging resources—particularly the log "semaphore"—dramatically increases, resulting in reduced system throughput. What is needed are system and methods which preserve database throughput by reducing the contention which occurs for logging resources, even when such a system is scaled up with multiple database engines. The present invention fulfills this and other needs.

SUMMARY OF THE INVENTION

A SQL database server system having an enhanced logging system is described. The logging system implements a "private log cache" (PLC) for reducing the contention on the system's "log" resource (which is protected by a log semaphore). An area of memory private to a user's task is set aside as a PLC—a cache where log records are built and stored before being posted to the log. Each PLC may hold multiple log records for a single transaction before they are flushed to the log (page chain) through the log semaphore. When a transaction commits or the memory fills with log records, the PLC associated with the transaction is flushed to the log. Because the log records for a complete transaction are immediately transferred through the log semaphore, contention on the log semaphore is lowered. Contention alleviated by the PLC dramatically increases transaction throughput of the database server system.

Because log records can reside in a user or private log cache, the present invention also provides a mechanism for ensuring that such records are flushed (to the log page chain) before the corresponding data page is flushed. If a change which affects a data page is represented in a private log cache, a "PLC pin" for that page is instantiated to point to a corresponding PLC structure. When such a data page is written, the system first unpins the PLC pin, thus causing the corresponding PLC structure to be flushed to the log page chain. Now, the data page will get a pin to the log, for indicating where in the log records must be flushed in order to write the data page. The addition of the second pointer to the data page buffer provides a two-phase unpinning mechanism. Unpinning a page now requires that the corresponding private log cache (i.e., the one being pointed to by the pointer stored in the page) be first flushed to the log page chain. Secondly, the in-memory log itself is flushed to disk (up to the point in the log required for writing that data page).

DETAILED DESCRIPTION OF A PREFERRED EMBODIMENT

The following description will focus on the presently preferred embodiment of the present invention, which is operative in a network environment executing client/server database applications. The present invention, however, is not limited to any particular application or environment. Instead, those skilled in the art will find that the present invention may be advantageously applied to any application or environment where optimization of logging performance is desirable, including non-SQL database management systems and the like. The description of the exemplary embodiments which follows is, therefore, for the purpose of illustration and not limitation.

Standalone System Hardware

Figure 1A:
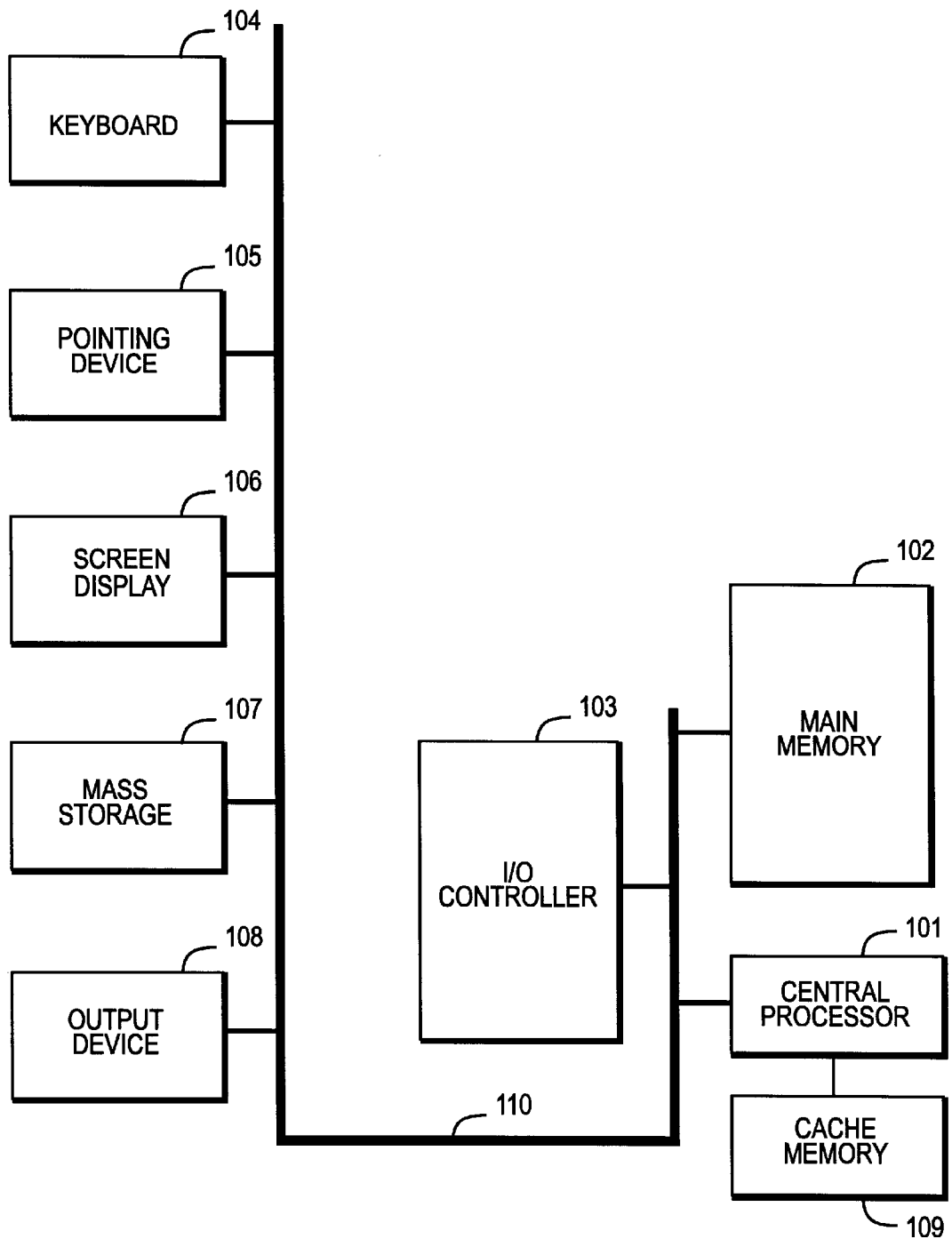
FIG. 1A is a block diagram illustrating a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a persistent or mass storage 107 (e.g., hard or fixed disk, removable or floppy disk, optical disk, magneto-optical disk, and/or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
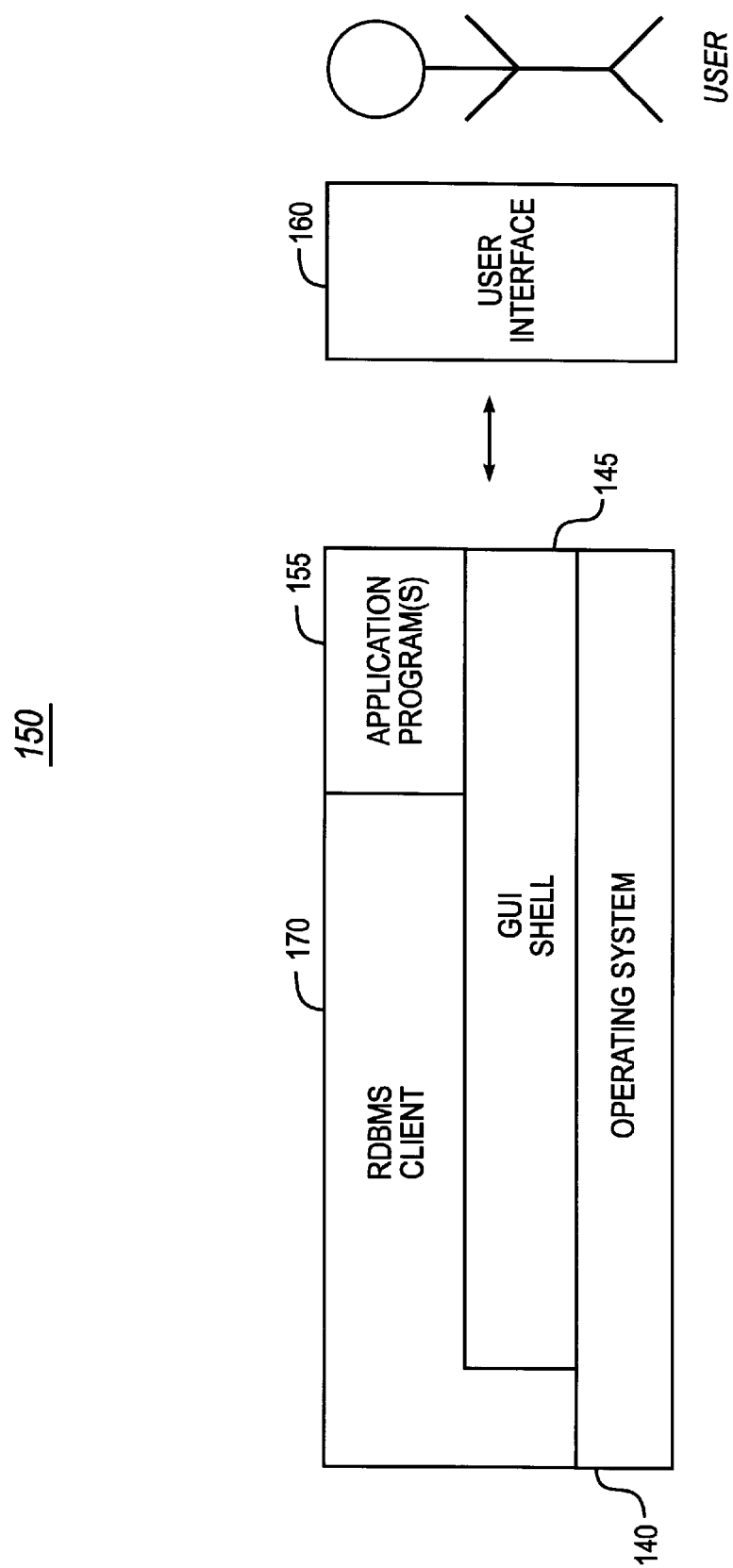
FIG. 1B is a block diagram illustrating a software subsystem for controlling the operation of the computer system of FIG. 1A

Illustrated in FIG. 1B, a computer software system 150 is provided for directing the operation of the computer system 100. Software system 150, which is stored in system memory 102 and on disk memory 107, includes a kernel or operating system (OS) 140 and a GUI (graphical user interface) shell 145. One or more application programs, such as application software 155, may be "loaded" (i.e., transferred from storage 107 into memory 102) for execution by the system 100. The system also includes a UI (user interface) 160 for receiving user commands as input and displaying user data as output. Although shown as a separate component, the UI 160 is typically provided by the GUI operating under the control of the OS 140, program(s) 155, and Relational Database Management System (RDBMS) client 170. The RDBMS client or "front-end" 170 itself may comprise any one of a number of database front-ends, including PowerBuilder™, dBASE®, Paradox®, Microsoft® Access, or the like. In an exemplary embodiment, the front-end will include SQL access drivers (e.g., Borland SQL Links, or Microsoft ODBC drivers) for accessing SQL database server tables in a Client/Server environment.

Client/Server Database Management System

Figure 2A:
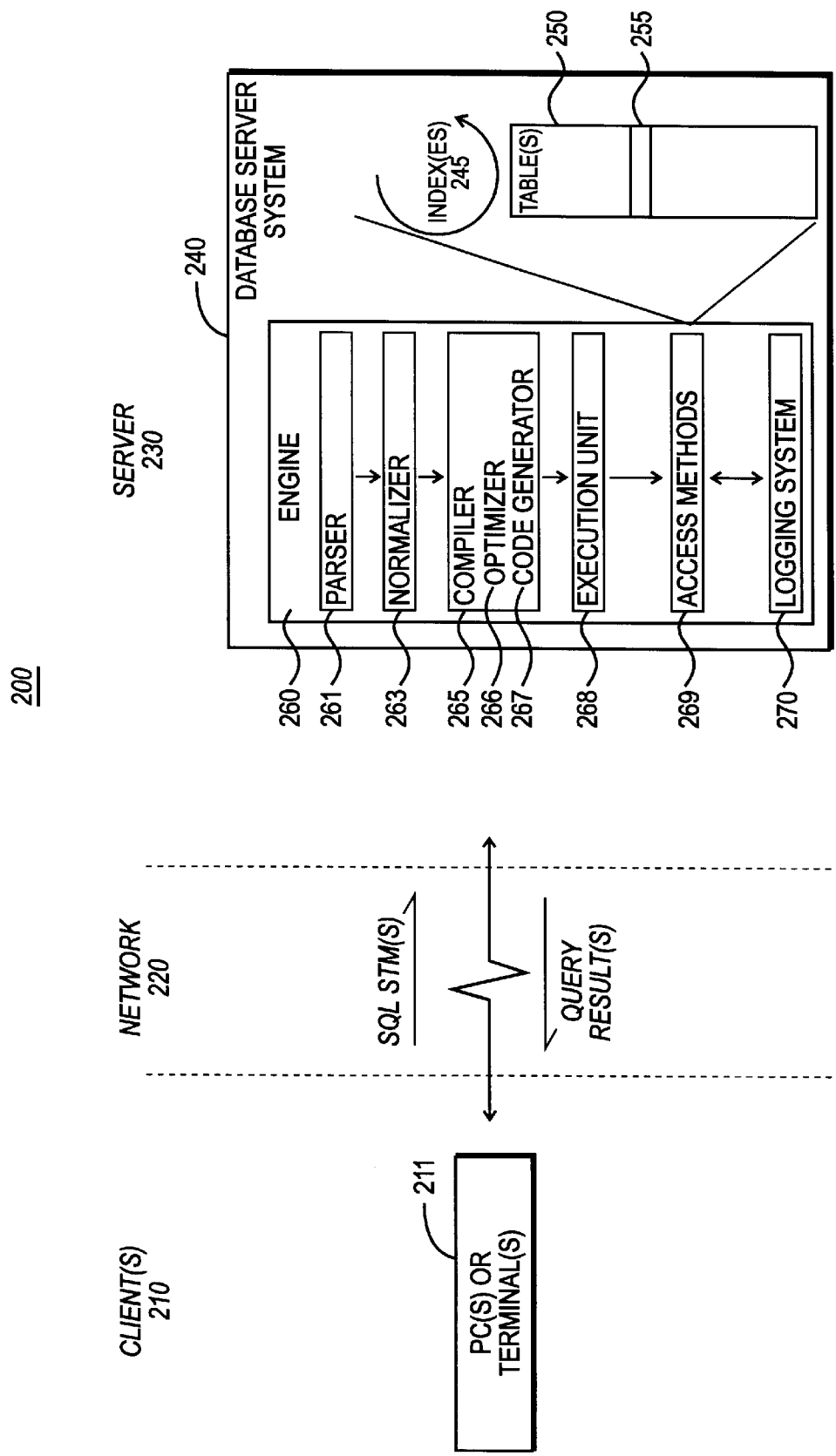
FIG. 2A is a block diagram of a client/server system in which the present invention is preferably embodied.

While the present invention may operate within a single (standalone) computer (e.g., system 100 of FIG. 1A), the present invention is preferably embodied in a multi-user computer system, such as a client/server system. FIG. 2A illustrates the general structure of a Client/Server Database System 200 which is preferred for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 240, which comprises Sybase SQL Server™ (Sybase, Inc. of Emeryville, Calif.) in an exemplary embodiment, generally operates as an independent process(es) (i.e., independently of the clients) running under a server operating system such as Microsoft Windows NT (Microsoft Corp. of Redmond, Wash.), NetWare (Novell of Provo, Utah), or UNIX (Novell). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client SQL calls and its parameters into a format (of one or more packets) suitable for transmission across a cable or wire, for delivery to the Database Server 240.

Client/server environments, database servers, and networks are well documented in the technical, trade, and patent literature. For a general discussion of database servers and client/server environments, see, e.g., Nath, A., *The Guide to SQL Server*, Second Edition, Addison-Wesley Publishing Company, 1995. Additional documentation of SQL Server™ is available from Sybase, Inc. as *SQL Server Documentation Set* (Catalog No. 49600). For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. application No. PCT/US90/04570, Intl. Publication No. WO 91/03024, Intl. Publication Date Mar. 7, 1991. For a general introduction to a Local Area Network operating under NetWare, see Freed, L. et al., *PC Magazine Guide to Using NetWare*, Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

In operation, the Client(s) 210 store data in or retrieve data from one or more database tables 250, shown in FIG. 2A. Typically resident on the Server 230, each table itself comprises one or more horizontal rows or "records" (tuples) together with vertical columns or "fields." A database record includes information which is most conveniently represented as a single unit. A record for an employee, for example, may include information about the employee's ID Number, Last Name and First initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

During a database session or "connection" with the Server, each Client issues one or more SQL commands to the Server. SQL commands may specify, for instance, a query for retrieving particular data (i.e., data records meeting the query condition) from the table 250. The syntax of SQL (Structured Query Language) is well documented; see, e.g., the abovementioned *An Introduction to Database Systems*. In addition to retrieving the data from Database Server tables, the Clients also include the ability to insert new rows of data records into the table; Clients can also modify and/or delete existing records in the table.

During system operation, the SQL statements received from one or more Clients 210 (via Network 220) are processed by Engine 260 of the Database Server System 240. The Engine 260 itself comprises a Parser 261, Normalizer 263, Compiler 265, Execution Unit 268, Access Methods 269, and Logging System 270. Specifically, the SQL statements are passed to the Parser 261 which converts the statements into a query tree—a binary tree data structure which represents the components of the query in a format selected for the convenience of the system. In this regard, the Parser 261 employs conventional parsing methodology (e.g., recursive descent parsing).

The query tree is normalized by the Normalizer 263. Normalization includes, for example, the elimination of redundant data. Additionally, the Normalizer performs error checking, such as confirming that table names and column names which appear in the query are valid (e.g., are available and belong together). Finally, the Normalizer can also look up any referential integrity constraints which exist and add those to the query.

After normalization, the query tree is passed to the Compiler 265, which includes an Optimizer 266 and a Code Generator 267. The Optimizer is responsible for optimizing the query tree. The Optimizer performs a cost-based analysis for formulating a query execution plan. The Optimizer will, for instance, select the join order of tables (e.g., when working with more than one table); it will select relevant indexes (e.g., when indexes are available). The Optimizer, therefore, performs an analysis of the query and picks the best execution plan, which in turn results in particular ones of the Access Methods being invoked during query execution.

The Code Generator 267, on the other hand, converts the query tree into a set of instructions suitable for satisfying the query. These instructions are passed to the Execution Unit 268. Operating under the control of these instructions, the Execution Unit 268 generates calls into lower-level routines, such as the Access Methods 269, for carrying out the query-specified operation, such as fetching relevant information (e.g., row 255) from the database table 250. After the plan has been executed by the Execution Unit, the Server returns a query result or answer table back to the Client(s).

For enhancing the speed in which the Database Server stores, retrieves, and presents particular data records, the Server maintains one or more database indexes 245 on the table. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file. As clients insert more and more data into a particular one of the table(s) 250, a corresponding one of the index(es) 245 continues to grow.

As transactions are processed by the system, Logging System 270 is used to log changes which occur to the system. In the commercial embodiment of Sybase SQL Server System 11, this is done by posting log records to a transaction log. Every transactional update to an object, including inserts, updates, and deletes, causes a log record to be written to the transaction log or simply "log." In SQL Server, the transaction log is referred to as "syslogs." Each particular log record characterizes the change which has occurred to the database during processing of a transaction. This information can be used, for instance, in error recovery, to restore the database to a pre-existing, consistent state.

The Logging System 270 will now be described in further detail. In particular, the description will focus on improved methods of the present invention for logging transactions.

Improved Transaction Logging

A. Introduction

Since a log is a shared resource in a mulit-user database system, much contention exists for the log, as multiple users desire concurrent access to the log for performing transactions. At the same time, a system must control access to the log for preventing one user from overwriting the results of another user.

The semaphore is employed for controlling access to the log. Often, a dedicated semaphore—a "log semaphore"—is employed for this purpose. The semaphore locks access to the system log table(s) so that a particular task can post log entries, as necessary, without interference from another concurrent task. Such an approach, however, presents a pronounced bottleneck to scalability. Each transaction which wants to write a log record must build the record on its stack, take out the log semaphore, and copy the log record into the page chain (where the log is currently being appended to).

The log itself exists in two versions: an in-memory version and a disk version. The in-memory version of the log exists as page chain in system memory. Here, data pages storing log records are linked together in memory to form a chain of pages. The in-memory log is flushed, at appropriate times, to disk for creating the disk version of the log. In typical operation, when a transaction "commits," the log records must first be written to disk before the database system proceeds with actually committing the transaction. "Write-ahead logging" is a rule in the database server governing how a data page (buffer) and its corresponding log records are written to disk. Succinctly stated, the rule dictates that a data page cannot be written to disk until the log records describing the change to that page have been (previously) written to disk. A given transaction will even "sleep" while waiting for its log records to be written to disk. Therefore, the log records must go to disk before the data pages.

Write-ahead logging is implemented by using a "pinning" mechanism. Each data page is associated with a context buffer storing housekeeping information for a data page, including a "log pin." The log pin is a pointer which points to the place in the log indicating up to where in the log the log must be flushed to disk before the data page itself can be written to disk. Until these log records are written to disk, the data page is "pinned" to the in-memory log (i.e., log page chain).

Complementing the notion of pinning is "unpinning." Consider a scenario where a database server's buffer manager desires to write a pinned buffer to disk (e.g., write the page to disk, according to a least-recently used scheme). Before the buffer manager can write that page to disk it should preferably "unpin" the page. As dictated by the write-ahead logging rule, this "unpinning" causes part of the log to be flushed to disk.

Figure 2B:
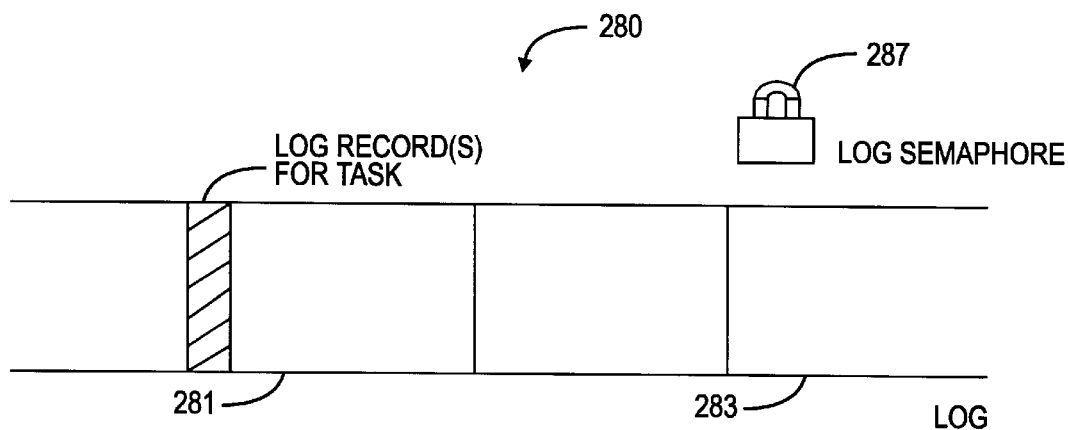
FIG. 2B is a simplified block diagram summarizing data structures conventionally employed for logging transactions.

FIG. 2B provide a simplified diagram summarizing the data structures employed for logging. As shown in FIG. 2B, the system log or "syslogs" comprises an in-memory page chain 280 including, for instance, log page 281 and log page 283. To post log records to the syslogs, a task must take out the log semaphore 287. In particular, as each record is appended to the syslogs, at log page 281, the log semaphore 287 is held. Without further improvement to the logging system, much contention would exist among the various tasks for the log. To provide improved scalability, therefore, one must solve the problem of contention for the log semaphore.

One approach to solving contention for a resource is to split up the resource. For a logging system, for instance, it is possible to employ multiple semaphores guarding different parts of the log. In general, however, a log is a structure where log records are appended to one end. Protecting the log structure with multiple semaphores would require multiple insertion points into the log. As readers of the log, such as recovery systems, rely on the log being sequential (e.g., for "playback" of log records), adding multiple insertion points leads to greater complexity in processing and maintaining the log. Quite simply, destroying the sequential nature of the log would convert it from a simple, easy-to-maintain structure to one which is far more complicated—one requiring complex processing at multiple subsystem levels other than that of the logging system (e.g., such as in the error recovery system). Since the sequential nature of the log is a fundamental property which is highly desirable to preserve, therefore, an approach employing multiple log semaphores is not attractive.

Another approach would be for a task to take out a log semaphore but not, at that point, copy the log record into the log. Instead, the task would simply reserve a space in the log structure, which would eventually receive a copy of the log record. Here, the semaphore is not held while copying but, instead, is only held for reserving a space—typically, a much shorter time period. The approach is not without problems, however. In particular, the approach creates "holes" in the log structure. Each hole represents a reserved space in the log which has yet to receive a log record. The approach leads to increased complexity in design and maintenance of the log since additional processing is required for correct treatment of "holes," for instance, during transaction roll back or error recovery.

B. "Private log caches"

1. Overview

A logging system, constructed in accordance with the present invention, provides a plurality of user or "private" log caches (PLCs). Instead of a task writing log records into the log page chain, the task instead buffers the log records in system memory. When the task needs to either flush that cache or commit the transaction, the system flushes the log records to the log page chain. At that instance, the task takes out the log semaphore and copies all the log records from the private log cache into the system log. Using this approach, each task requires the log semaphore much less frequently, since the semaphore is only needed at the point where log records are flushed from the private log cache to the log page chain.

Figure 2C:
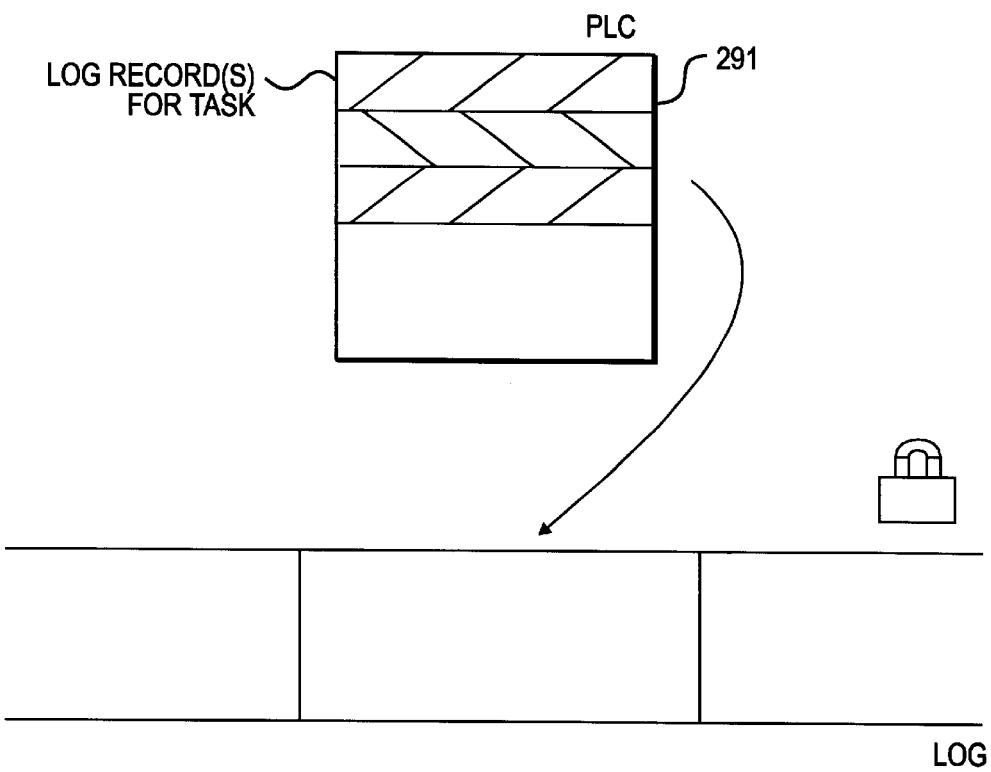
FIG. 2C is a simplified block diagram illustrating improved data structures employed in the system of the present invention for logging transactions.

FIG. 2C provide a simplified diagram illustrating the improved data structures employed for logging in the system of the present invention. As shown, each task writes a generated log record to its own "private log cachet"—a region of memory reserved for the particular database connection or "user." For instance, the task first writes its log records to private log cache 291. The log semaphore, shown as 291, is not held by the task during this process. Only when the private log cache for a task needs to be flushed to the actual log is the log semaphore taken out by a task. In instances where a page can be concurrently updated without a transactional lock (e.g., OAM (Object Allocation Map) pages in Sybase SQL Server), the PLC containing log record(s) describing a change to such a page are flushed before the end of the transaction. In either instance, the approach of the present invention greatly reduces contention for the log semaphore.

A consequence of this approach is that log records tend to be much more grouped together. In other words, the log records for a given task or connection will tend to be grouped together as they are flushed as a group from the private log cache of a task to the log page chain. What is important to note, however, is that the sequence of the log records is preserved on a per transaction basis.

2. Improved Logging Data Structures

Figure 3A:
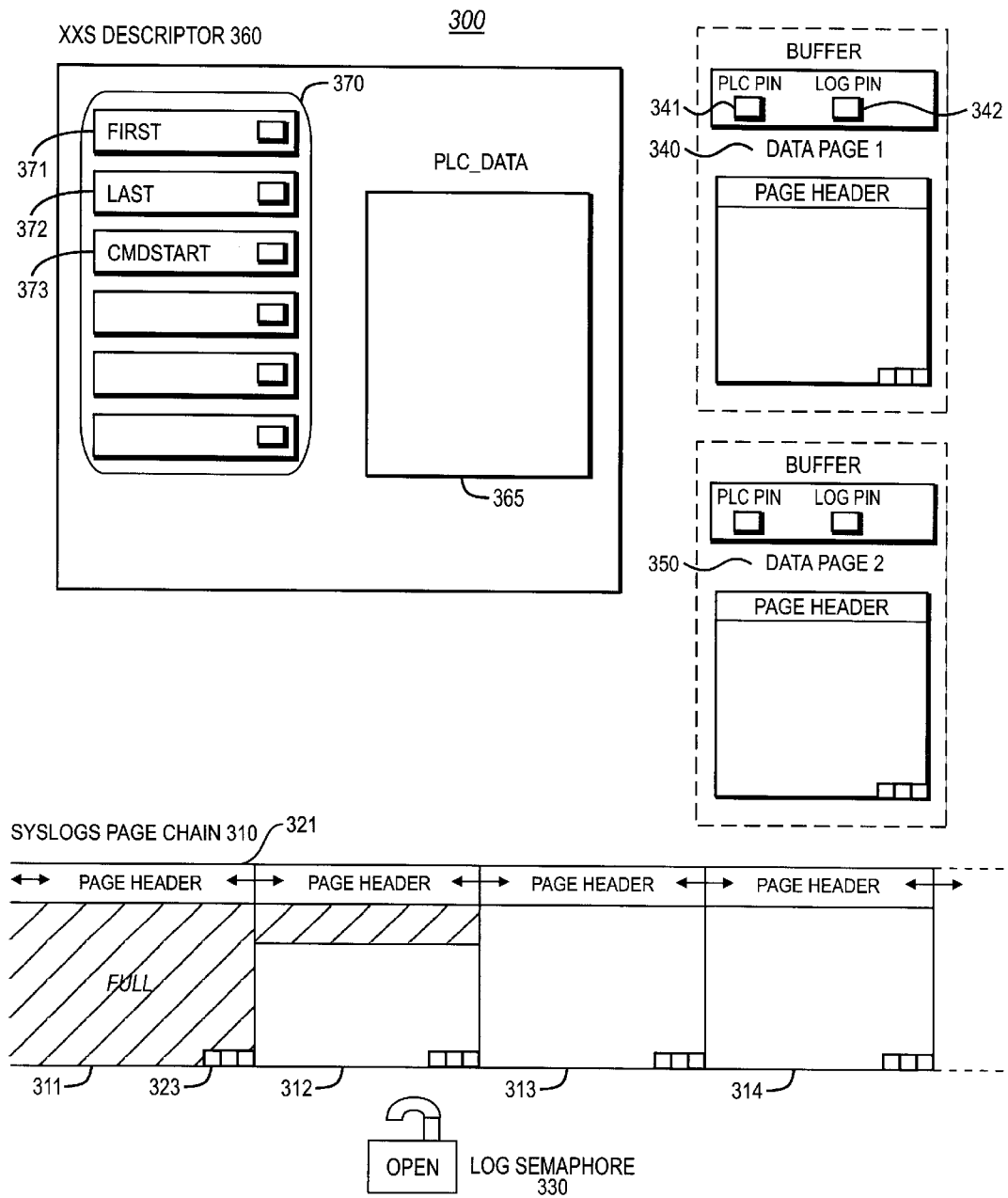
FIG. 3A is a detailed block diagram illustrating improved data structures employed by the system of the present invention for logging transactions.

Before describing internal methods of operation for the system, it is first helpful to examine in further detail the core data structures employed by the system. FIG. 3A illustrates logging data structures 300, which interact during system operation. The data structures include a syslogs page chain 310—a representation of the log in system memory. The page chain itself is comprised of individual pages, such as pages 311, 312, 313, and 314. As shown, each page includes a page header (e.g., page header 321 for page 311) which stores housekeeping information for its page. Also shown, each page stores forward and backward pointers for referencing previous and next neighbors in the page chain. Each page also includes a directory or row lookup 323 for locating the particular offset in the page where a given record (identified by row number) is located. Access to the page chain, which is globally shared, is provided through log semaphore 330. By reducing contention for the log semaphore 330, system scalability improves.

The right hand side of FIG. 3A illustrates two data pages: data page 1 (340) and data page 2 (350). Each data page is associated with a buffer data structure which stores information for supporting the in-memory image of the page. Although shown together, a data page image and its corresponding buffer data structure do not necessarily reside in contiguous portions of memory. The information stored by the buffer structure is relevant only when the data page resides in-memory (as opposed to on-disk). Information which is relevant includes, for instance, a PLC pinning flag (e.g., pin 341) as well as a log pinning flag (e.g., pin 342).

The logging data structures 300 also include a transaction logging descriptor (XXS) 360. In an exemplary embodiment, this data structure is linked (via a pointer) to a transaction descriptor (xdes) data structure which completely characterizes a transaction. Implementation of an xdes data structure is described in commonly-owned, co-pending application Ser. No. 08/537,020, filed Oct. 2, 1995, the disclosure of which is hereby incorporated by reference. The XXS data structure, on the other hand, may be constructed as follows (using the C programming language).

```
/*
** XXS - XLS Session descriptor
*/
typedef struct xxs
{
    /* Link for active transaction list - MUST BE FIRST */
    LINK        xxs_activelist;
    /* External data to XLS - none */
    /* Internal data */
    /*
    ** This set remain constant once the XXS object
    ** is attached to the XDES object.
    */
    struct xdes    *xxs_xdes;    /* Pointer to attached XDES */
    struct pss     *xxs_pss;     /* Pointer to task's PSS
                                 ** (housekeeping)
                                 */
    PLCSTATE       *xxs_plc;     /* Pointer to task's PLC */
    /*
    ** This set remain constant during a transaction.
    */
    struct dbtable    *xxs_dbt;   /* Database for transaction */
    /*
    ** This set varies over the life of a transaction.
    */
    struct sdes *xxs_syslogs_xact;    /* SDES for SYSLOGS for xacts */
    uint32         xxs_state;    /* State of XLS session */
    int            xxs_plclrn;   /* LRN id of first lr in PLC */
    int            xxs_count;    /* Total number of lr's written */
    circ_long      xxs_flushseq;     /* Current dirty seq. for flush */
    int            xxs_error;    /* Error for last failure */
    struct sdes    *xxs_syslogs_scan;    /* SDES for SYSLOGS for SCANs */
    XLSCAN         *xxs_scan;    /* Current scan structure */
```

-continued

```
    uint32       xxs_reqmarkers;
    uint32       xxs_nlreqmarkers;
    XLRMARKER    xxs_markers[XLSM_NUM_MARKERS];
}XXS;
```

The XXS data structure references a private log cache data structure or "PLC object," as shown at 365. This controls the region in memory where the log records are actually cached. In an exemplary embodiment, the PLC object (an object of type PLCSTATE) may be constructed as follows.

```
/*
** PLCSTATE - PLC object
**
** The PLCSTATE holds the state information for the PLC itself.
** Each PLCSTATE owns one PLC_DATA object, which is where
** log records are actually cached.
**
** XXS <-> PLC synchronisation
**
**   plc_xkeeper -   Identifies the the XLS session (via the internal
**                   descriptor (XXS *)) that keeps the PLC. This field
**                   may only be changed by the task that owns
**                   the XLS session and only when holding the PLC
**                   lock.
**
**                   This means that the keeper of the PLC can read
**                   this field without any synchronisation. All other
**                   tasks must grab the PLC lock to see a stable value for
**                   this field.
**
**                   The PLC at any time is kept by at most one XLS
**                   session. If an XLS session does not have the PLC kept
**                   (plc_xkeeper is NULL), then there can be
**                   no log records in the PLC. The thread owning
**                   the PLC may avoid locking the PLC if the current XLS
**                   session does not have the PLC kept. The assumption
**                   is that other threads have no interest in the PLC
**                   when it is empty.
**
**   plc_lockcount Can only be read and modified under the PLC
**   spinlock.
*/
typedef struct plcstate
{
    /* External data to XLS - none */
    /* Internal data */
    /*
    ** This set remain constant once the PLCSTATE object
    ** is attached to the PLC_DATA object.
    */
    struct    spinlock  *plc_spinlock;    /* Spinlock for PLC */
    BYTE      *plc_start;                 /* Start of PLC_DATA */
```

```
-continued

BYTE     *plc_end;              /* End of PLC_DATA */
    int      plc_maxpagecount;      /* Maximum number of
                                    ** log pages required
                                    ** to flush the PLC.
                                    */
    /*
    ** This set is variable during the life of the PLCSTATE
    */
    int      plc_lockcount;         /* PLC semaphore count */
    int      plc_waiters;           /* # of waiters for PLC lock */
    int      plc_maxlength;         /* max len of next log rec */
    int      plc_count;        /* # of log records in PLC */
    int      plc_logspace_free;     /* number of bytes still
                                    ** reserved in log through
                                    ** the threshold manager.
                                    */
    /*
    ** plc_offset :
    **
    ** if the PLC is not being flushed then plc_offset is the
    ** address where the next log record will be placed in the PLC.
    **
    ** Otherwise plc_offset is the address of the next log record
    ** to be removed from the PLC.
    */
    BYTE       *plc_offset;
    struct xxs *plc_xkeeper;    /* Current XXS keeper of PLC */
    struct pss *plc_locker;     /* Pss of task locking the PLC */
    struct syb_buf *plc_bufhead;  /* Header of pinned buffer chain
*/
}PLCSTATE;
```

Although the figure suggest that PLC is inside the XXS data structure, in a preferred embodiment the XXS data structure would instead store a pointer or handle referencing the PLC structure or object.

The XXS data structure 360 also stores or is associated with an array of transaction log record (XLR) markers 370. In a preferred embodiment, the array 370 comprises a fixed array (size=6) XLR markers. Each array entry, which serves as a pre-defined marker pointing to a particular part of the transaction, may be constructed from the following definitions.

```
/*
** XLRMARKER - Log Record Marker - OPAQUE to XLS clients.
**
** Clients of the XLS must not assume or have knowledge of
** any of the below.
**
** Internally a XLRMARKER has two formats, non-permanent and permanent.
**
** In the non-permanent form the marker is the numeric
** order of the log record with the first being XXS_LRN_FIRST (==1).
** This is stored in u_xlr_marker.
**
** In the permanent form the marker is the RID of the log record
```

-continued

```
** (ie. once it has made it to the log page chain). This is stored
** in u__xlr__rid.
*/
typedef  struct xlrmarker
{
     union
     {
         struct
         {
              pgid__t    fakepage;
              int32 u__xlr__marker;
         }s;
         RID   u__xlr__rid;
     }u;
} XLRMARKER;
/* Markers stored in XXS */
#define  XLSM__FIRST  0           /* First log record of transaction */
#define  XLSM__LAST   1           /* Last log record of transaction */
#define  XLSM__CMDSTART       2         /* Client defined CMDSTART */
#define  XLSM__ABORTMARK      3         /* Client defined ABORTMARK i.e.
                           ** a place in log to rollback to
                           */
#define  XLSM__LASTSAVE       4         /* Client define LASTSAVE
                           ** i.e. a savepoint in log to rollback to
                           */
#define  XLSM__LASTINPAGECHAIN      5    /* Last log record added to page
chain */
#define  XLSM__NUM__MARKERS   6         /* Number stored in XXS */
/* Markers not stored in XXS */
#define  XLSM__SCAN  (-1)         /* Current log record of log scan */
#define  XLSM__OLDESTXACT     (-2)      /* Oldest active transaction */
#define  XLSM__LOGLAST        (-3)      /* Last log record in log page chain */
#define  XLSM__LOGFIRST       (-4)      /* First log record in log page chain
*/
```

Client code refers to the markers by indexing into the array.

The first three markers are of particular interest to the present invention. The "first" XLR marker 371 points to the first log record associated with a transaction. In a corresponding manner, the "last" XLR marker 372 points to the last log record associated with the transaction. Finally, the "command start" XLR marker 373 points to the log record associated with the first data access/manipulation command of the current SQL statement (e.g., SQL INSERT command).

Figure 3B:
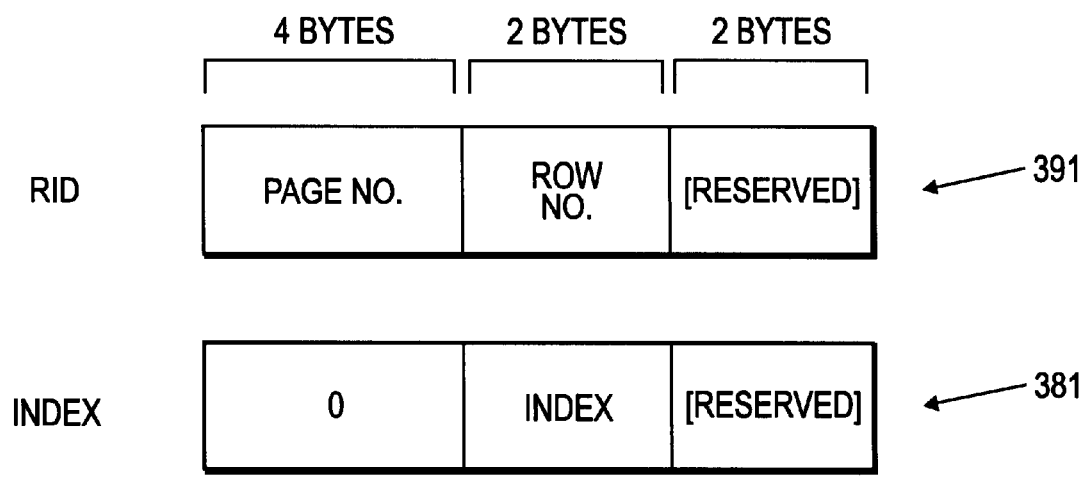
FIG. 3B is a block diagram illustrating a transaction log marker or XLRMARKER employed by the system of the present invention for tracking log records.

As indicated by the definition for XLRMARKER and illustrated in FIG. 3B, each XLR marker can take one or two forms. In a first form, the marker stores a pointer 381 to a log record while the log record is in a private log cache. In an alternative form, the marker stores a "RID"—a record ID—as shown at 391. In this latter form, the marker points to the log record in the page chain by referencing a particular ID of the page together with a row number on that page where the record is located. The index stored by pointer 381, on the other hand, simply is the ordinal number of the log record within the transaction; it is used to locate a record within the PLC.

3. Two-phase "Pinning" and "Unpinning"

Recall that the "log pin" represents where in the log page chain log records must be flushed to disk before the corresponding data page can be flushed. Besides this mechanism, the present invention introduces a second mechanism. Because log records can reside in a (user) private log cache (i.e., per "user" connection), a mechanism is needed to ensure that such records are flushed (to the log page chain). If a change which affects a data page is represented in a private log cache, the PLC pin for that page will be instantiated and will point to the corresponding PLC__DATA data structure (through the xdes data structure). In this manner, when such a data page is written, the system first unpins the PLC pin, thus causing the corresponding PLC__DATA data structure to be flushed to the log page chain. Now, the data page will get a pin to the log, for indicating where in the log records must be flushed in order to write the data page. The addition of the second pointer to the data page buffer provides a two-phase unpinning mechanism. Unpinning a page now requires that the corresponding private log cache (ie., the one being pointed to by the pointer stored in the page) be first flushed to the log page chain. Secondly, the in-memory log itself is flushed to disk (up to the point in the log required for writing that data page).

C. Methods of using private log caches

Operation of the internal methods in the system of the present invention are perhaps best described by way of example. The following description will focus on various logging scenarios and describe changes which occur to the core data structures throughout these scenarios.

1. EXAMPLE #1

Figure 4A:
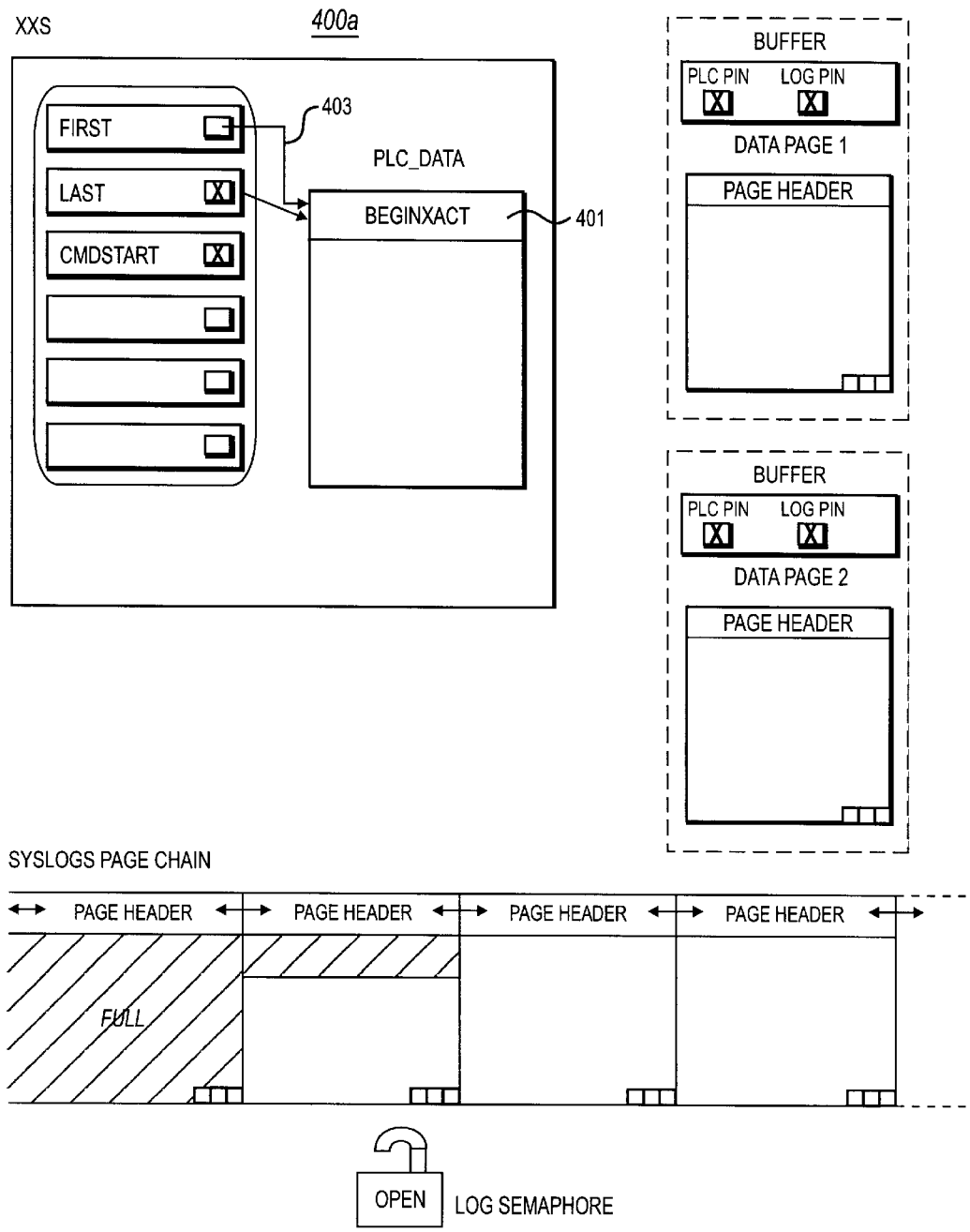
FIGS. 4A–E are block diagrams illustrating operation of the system of the present invention for logging a transaction which includes an INSERT operation affecting two data pages.

FIGS. 4A–D illustrate operation of the system for a transaction which includes an INSERT operation affecting two data pages. FIG. 4A represents the state of the logging data structures (400a) at the outset, when the transaction first begins (i.e., corresponding to the point of processing an SQL statement of BEGIN TRAN). Here, a "begin transaction" log record (BEGINXACT) is posted to the corresponding private log cache, as indicated at 401. Further, the "first" XLRMARKER is now instantiated to point or index into this first log record, as shown at 403. The "last" XLRMARKER also points at this record. Other pointers at this instance either point to themselves or store NULL values, as indicated by "X".

At the point in time indicated by FIG. 4A, no actual work has begun. Note that in contrast to prior systems, however, the truncation point in the log (page chain) is not tied up. Specifically, the "begin transaction" log record is not "sitting" in the log page chain but, instead, resides in the private log cache. Further, the system includes at this point an additional flag for indicating that no user data resides in the private log cache. If for some reason the cache needs to be flushed (e.g., because of another transaction), the system knows as a result of the flag that there is not useful user data to be flushed from the private log cache, since it only contains a single "begin transaction" record. In an exemplary embodiment, the flag is maintained by the XXS context descriptor data structure.

Figure 4B:
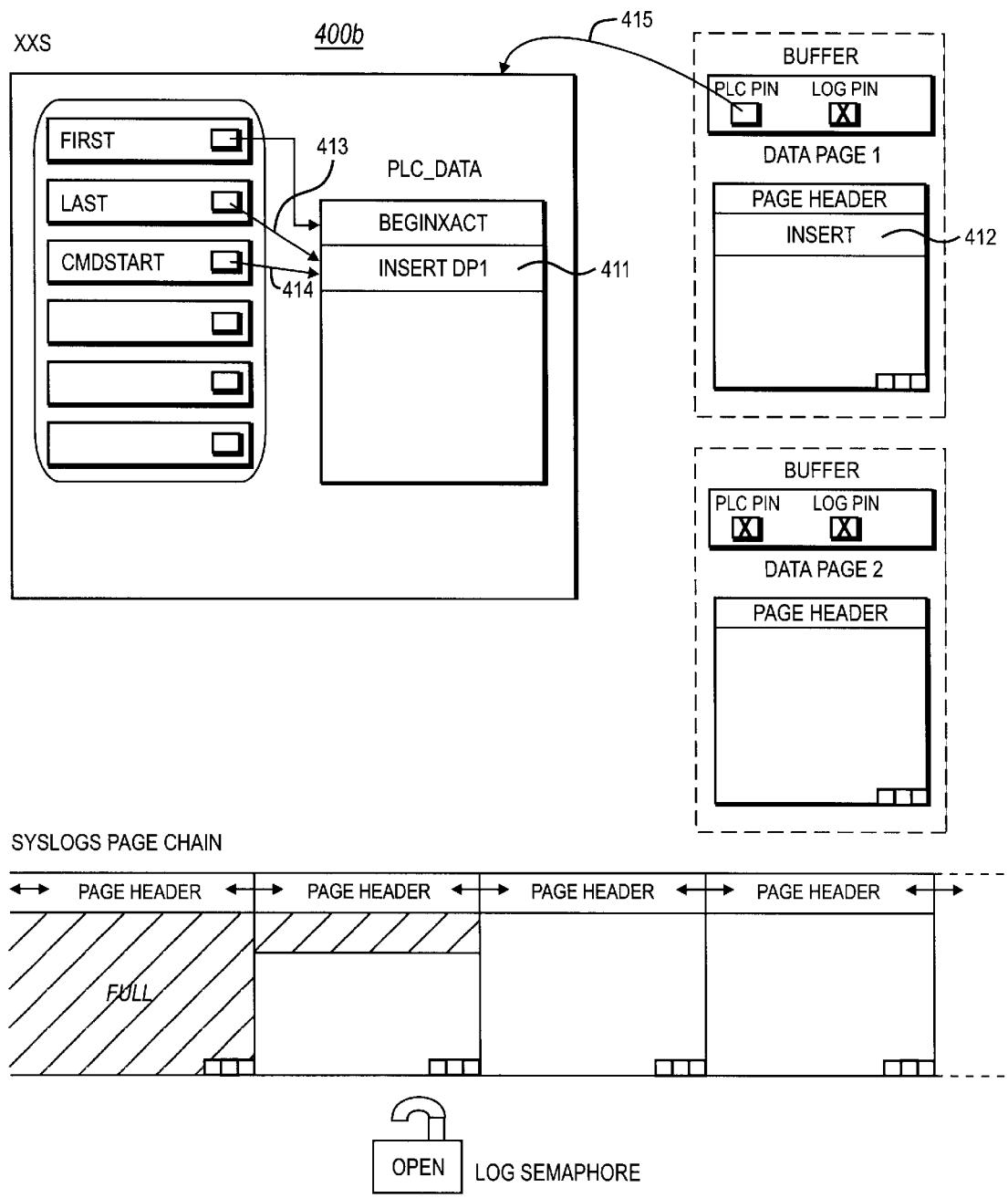
Figure 4C:
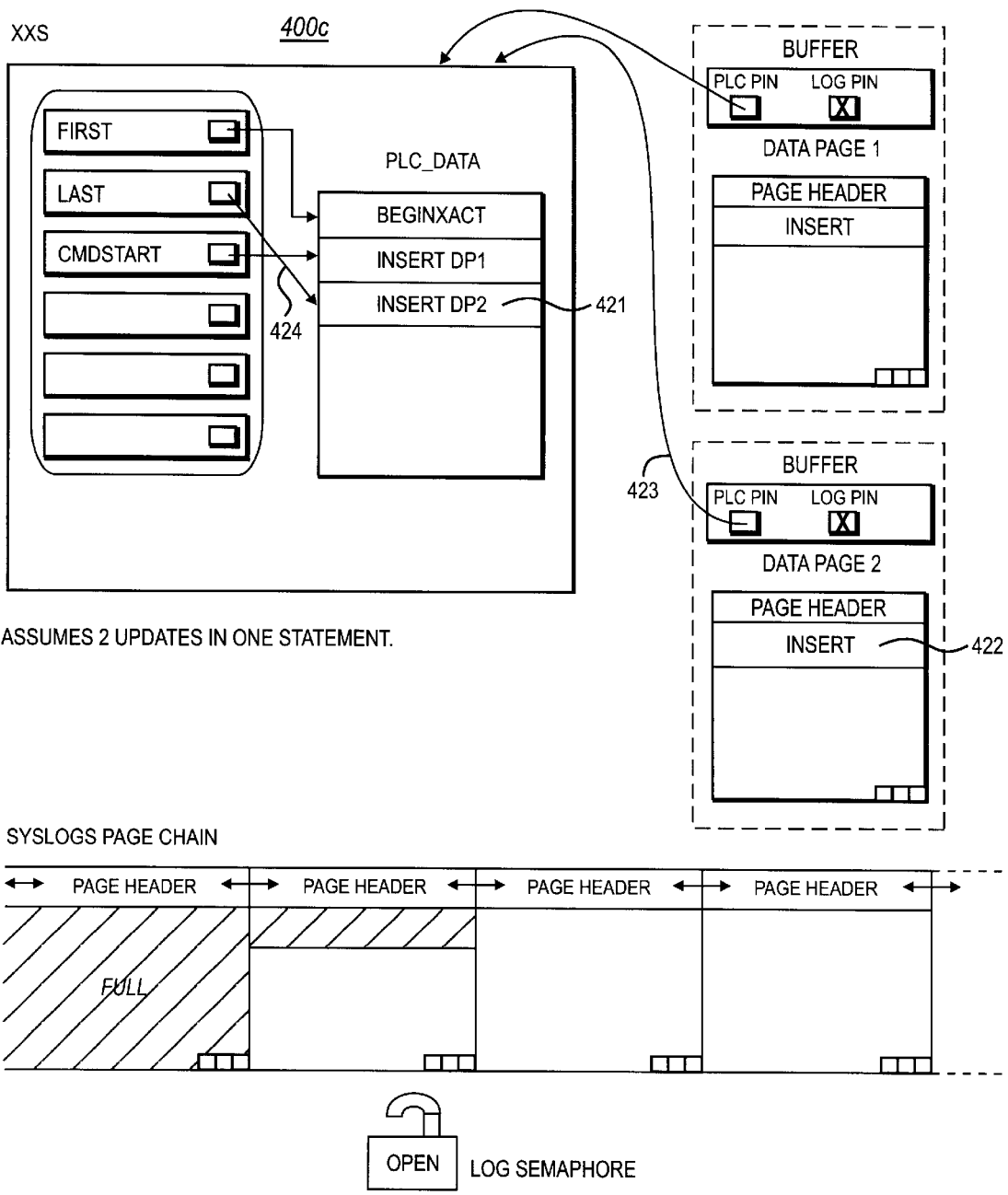

FIG. 4B illustrates a point in time when actual work has begun. For this example, the transaction has undertaken an INSERT (e.g., as a result of an INSERT SQL statement). The logging data structures, now illustrated as 400b, change as follows. A new log record, INSERT DP1, is appended to the private log cache, as shown at 411. This represents an "insert" log record which indicates that an INSERT operation is occurring at data page 1, as shown at 412.

Further, the "last" marker and the "command start" marker are instantiated as follows. The "last" marker now points to this newly-added log record, as indicated at 413. This last marker now indicates the last log record written by the transaction (at this point in time). At this point, the "command start" marker stores a pointer or reference to the INSERT log record as indicated at 414. The "command start" marker now also points to the newly-added log record, but for different reasons. Here, the log record indicates the start of a command statement, here, an SQL INSERT statement. This information is useful in the event that the system needs to roll back the statement: it can roll back the effects which have occurred to the start of the statement.

In addition to data being inserted into data page 1, the page is "pinned." Here, the PLC pin is instantiated to point to the private log cache, as indicated at 415. In the currently-preferred embodiment, the PLC pin stores a reference to the xdes data member which, in turn, stores a reference to the XXS data member which, in turn, pins the page to the PLC data structure.

Proceeding with the example, suppose an insert occurs on data page 2. This may occur, for instance, as a result of insertion of a data record having a key value which requires that the data record be stored on data page 2. This may occur, for instance, because of an existing clustered index requiring particular records to be inserted into particular data pages (based on key value). As a result, another "insert" log record is appended to the private log cache, as shown at 421 for log data structures 400c. This represents the insertion of data into data page 2, as indicated at 422. Data page 2 is now also "pinned" to the private log cache, as indicated at 423. Specifically, it stores a reference to the xdes data member which controls the XXS data member. Finally, the XLR-MARKERs are updated by setting the "last" marker to point to the newly-added "insert" log record, as indicated at 424.

Figure 4D:
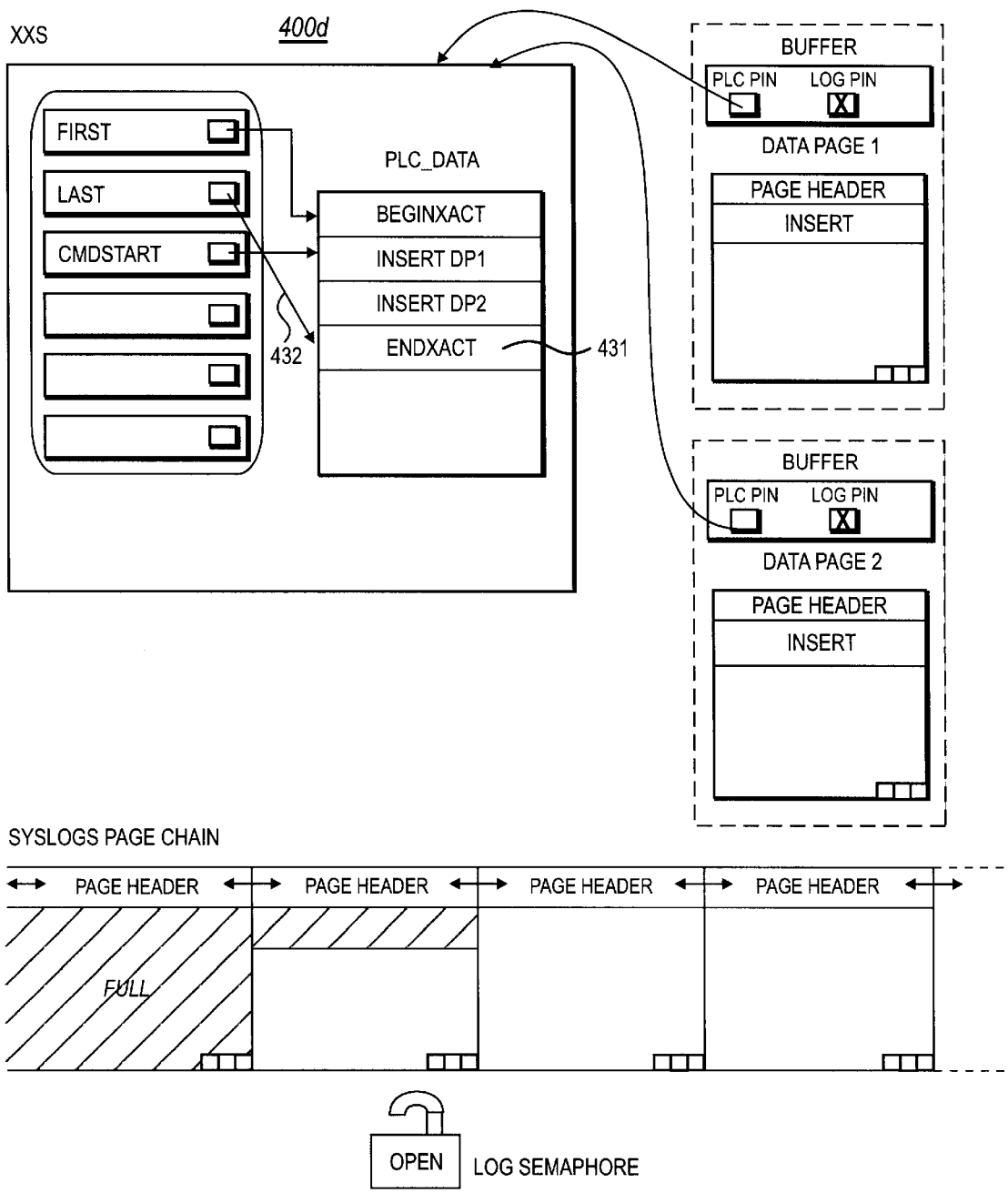

FIG. 4D illustrates the state of the data structures (now 400d) at the time when the transaction is to be committed (i.e., corresponds to SQL COMMIT statement). As shown, an "end transaction" record (ENDXACT) is appended to the private log cache, as shown at 431. Now, the "last" marker is updated to point to this newly-added log record, as indicated at 432. At this point, the user is trying to commit the transaction. For the system, this means that all the log records for the transaction must go to disk.

Figure 4E:
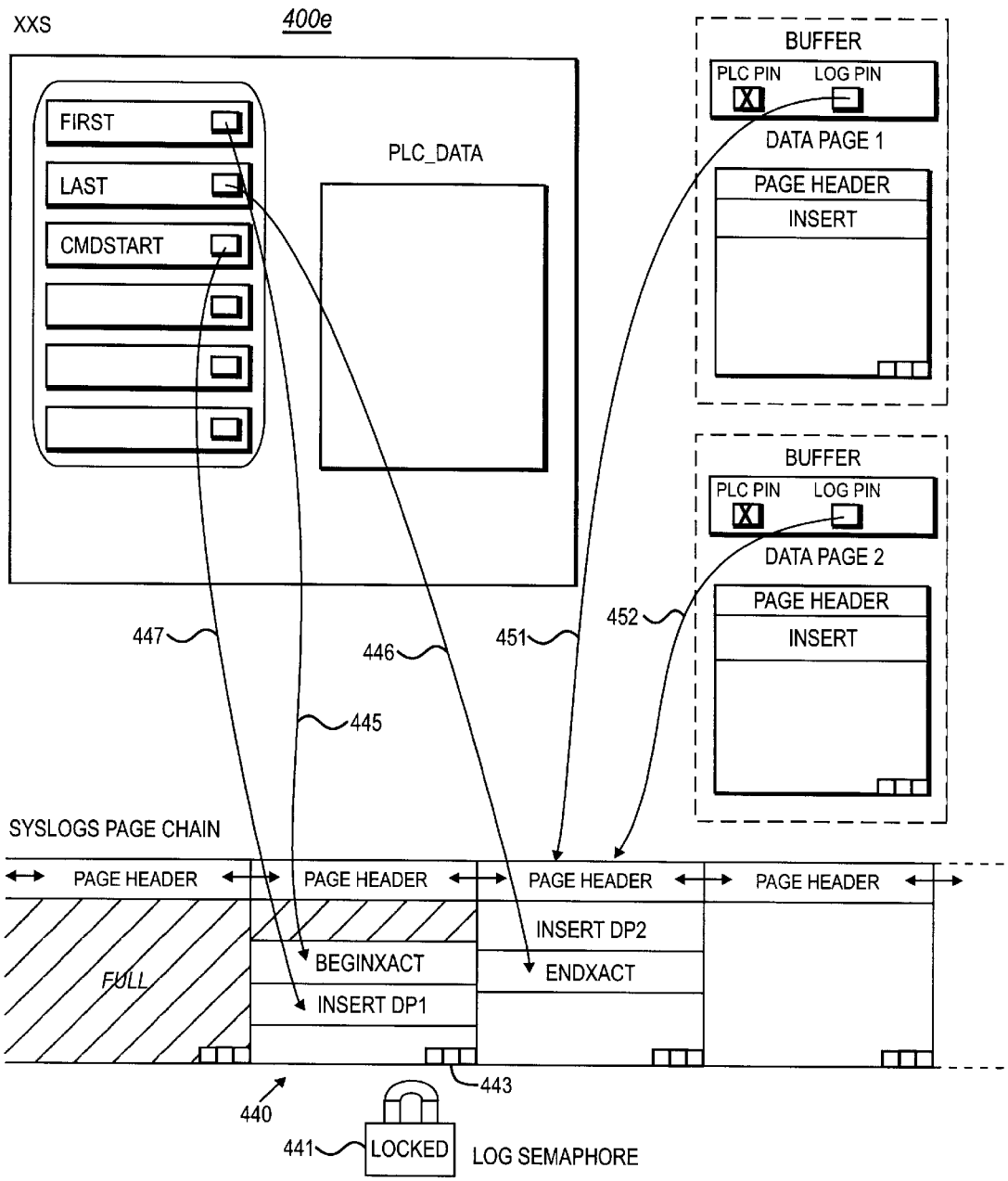

FIG. 4E illustrates the state of the logging data structures (now 400e) at the point when the log records have been flushed to the log page chain. FIG. 4E therefore represents a continuation of the events which occur at commit time. As indicated at 440, the log records have been copied from the PLC to the page chain. During this copy operation, the log semaphore is held, as indicated at 441. As each log record is copied, if there is a marker that points to that record then the marker is updated to now store a RID (record ID) value, for indicating the new location of the log record in the log page chain. Recall that each RID value comprises a page ID and row number. Each row number itself points to an entry in a row number table or directory (e.g., row number table 443). Each row number table entry, in turn, points to a particular offset within the page where the row begins.

As the BEGINXACT log record is copied to the log page chain, the "first" marker is updated, with a RID value, for pointing to the corresponding location of the log record in the page chain, as indicated at 445. In a similar fashion, the "last" marker is updated to point to the ENDXACT log record in the page chain, indicated at 446. The "command start" marker, similarly, now points to the "insert" log record in the page chain, as indicated at 447. The three markers have all been updated to point to their respective log records, now stored in the log page chain.

In addition to the changes to the log records and the markers, the buffers are updated as follows. Each buffer is "unpinned" from the PLC structure and then "pinned" to the log page chain. The buffers for data pages 1 and 2 are "unpinned" from the PLC structure and then "pinned" to the last log page storing the flushed log records, as indicated at 452. Therefore, in a manner similar to that done for the markers, the buffers are now pinned to the log page chain.

2. EXAMPLE #2

Figure 5A:
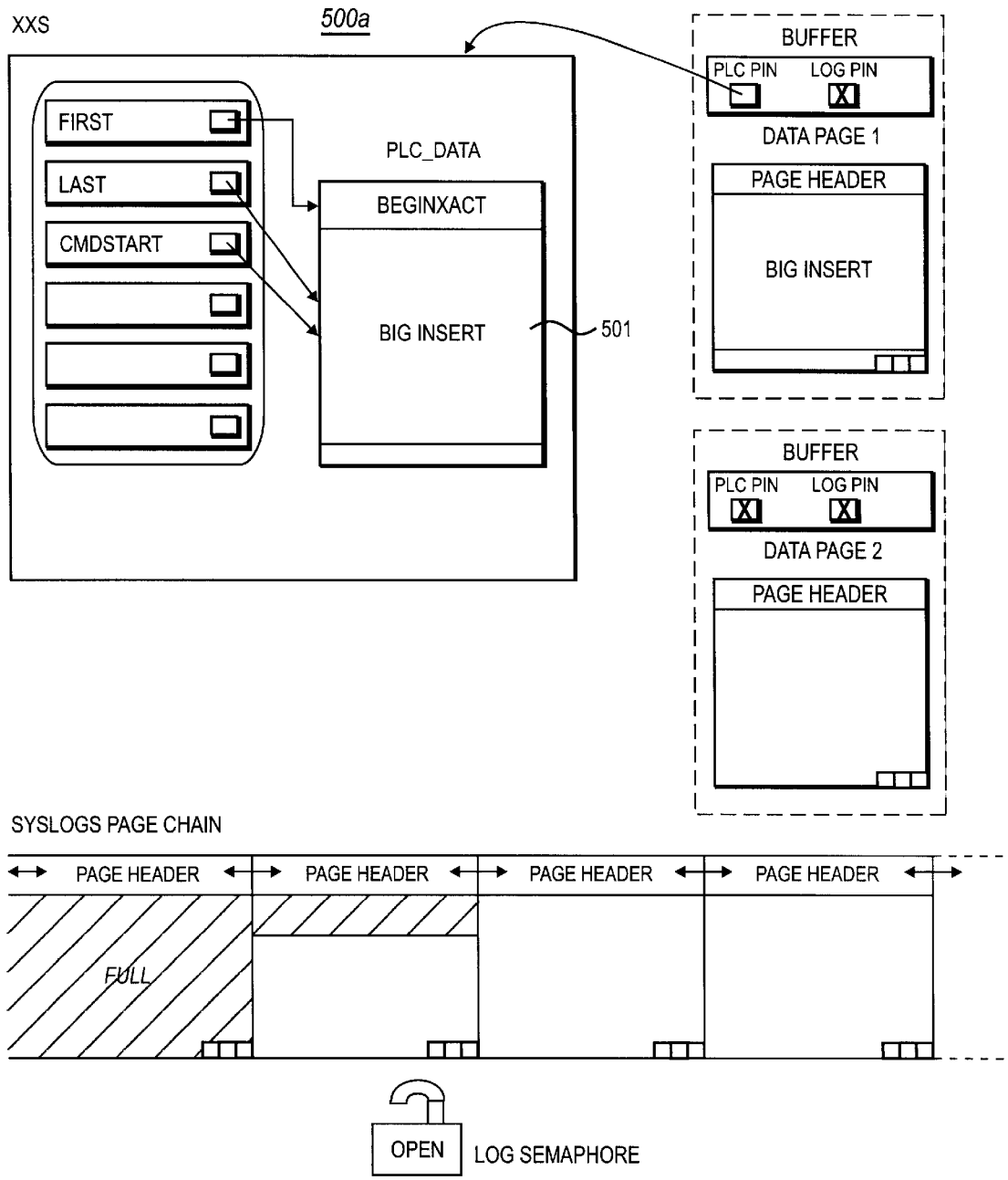
FIGS. 5A–E are block diagrams of the logging data structures illustrating system processing when a private log cache (PLC) reaches a state where it is full.

The next example illustrates processing when the private log cache reaches a state where it is full. FIG. 5A illustrates the state of logging data structures (500a) at the point which a transaction has begun and a command to insert a large row (i.e., "big" INSERT) has been processed. As illustrated at 501, the insert is sufficiently large that it has almost filled up the private log cache. For this example, another insert will occur which cannot be immediately accommodated by the private log cache.

Figure 5B:
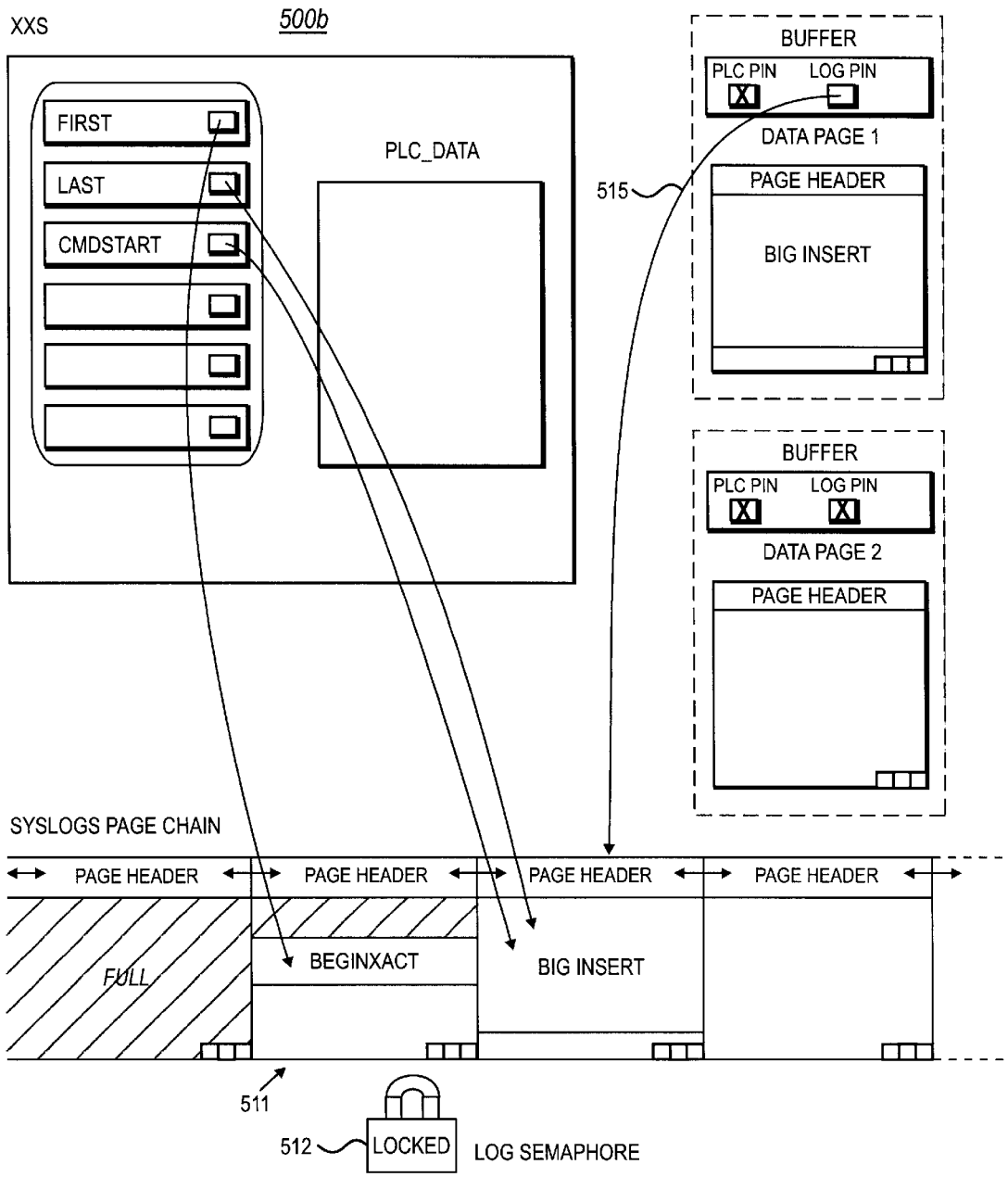

FIG. 5B illustrates the logging data structures (500b) when the additional insert has arrived. Now, since the private log cache cannot accommodate the new insert, the previous "big" INSERT (log records) need to be flushed from the private log cache to the log page chain. As illustrated in FIG. 5B, the log records are copied to the log page chain, indicated at 511. This is done under the control of the log semaphore, as shown at 512. In a manner similar to that described above, the XLRMARKERs are updated to now point to their respective log records as they reside in the log page chain. Also, the buffer (buffer for data page 1) is "unpinned" from the private log cache and "pinned" to the corresponding log page chain, as indicated at 515.

Figure 5C:
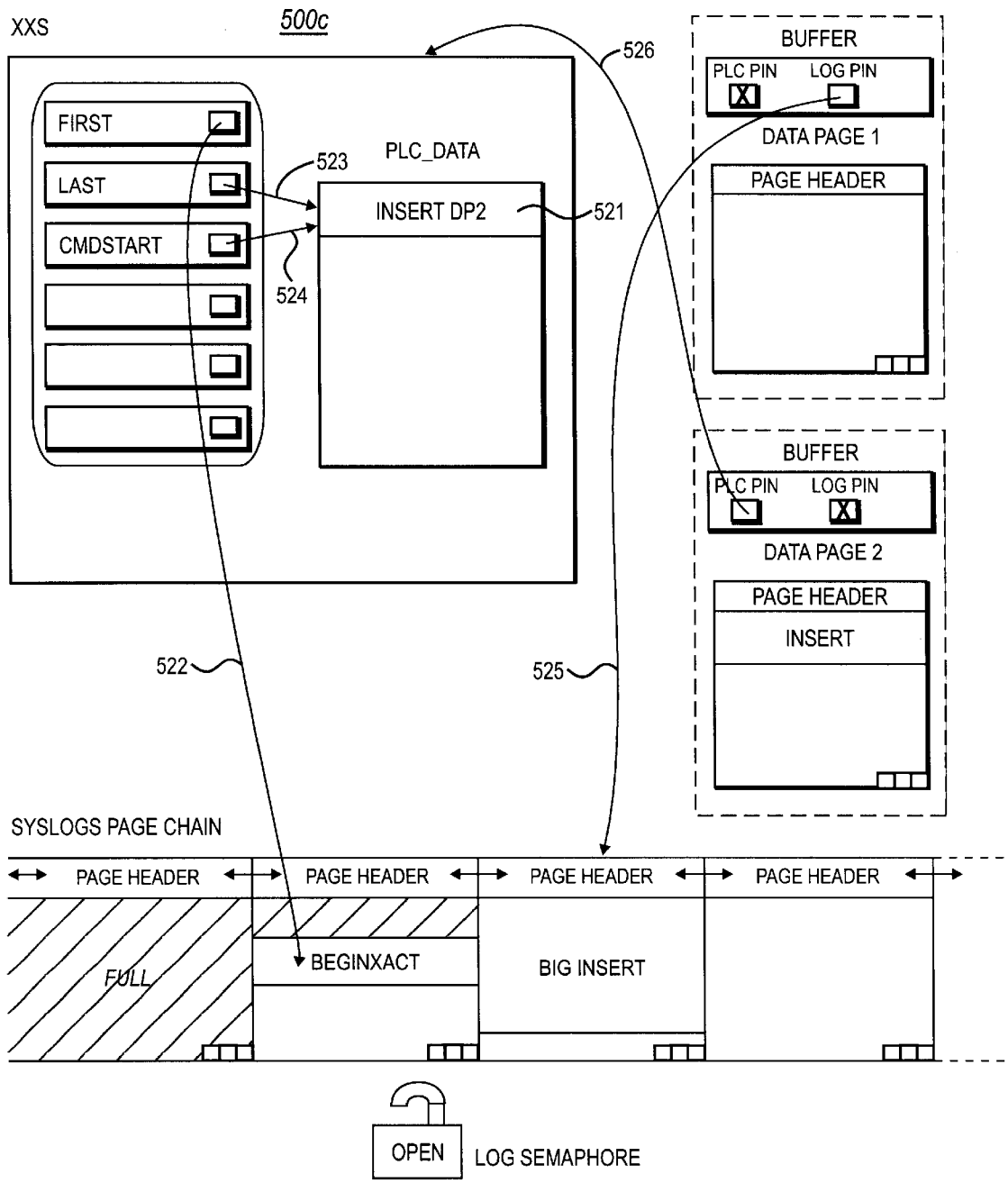

FIG. 5C illustrates the state of the logging data structures (500c) at the point of processing the new insert. Now, the "insert" log record for the data insert on data page 2 is appended to the private log cache, as indicated at 521. The "first" marker points to the log record in the log page chain, as indicated by 522. The "last" marker points to the new "insert" log record, as indicated at 523. Additionally, the "command start" marker points to the new "insert" log record, illustrated at 524, since the insert is associated with a different statement (i.e., different SQL INSERT statement). At this point, data page 1 is pinned to the log, as indicated at 525. Data page 2, on the other hand, is pinned to the private log cache, as indicated at 526.

Figure 5D:
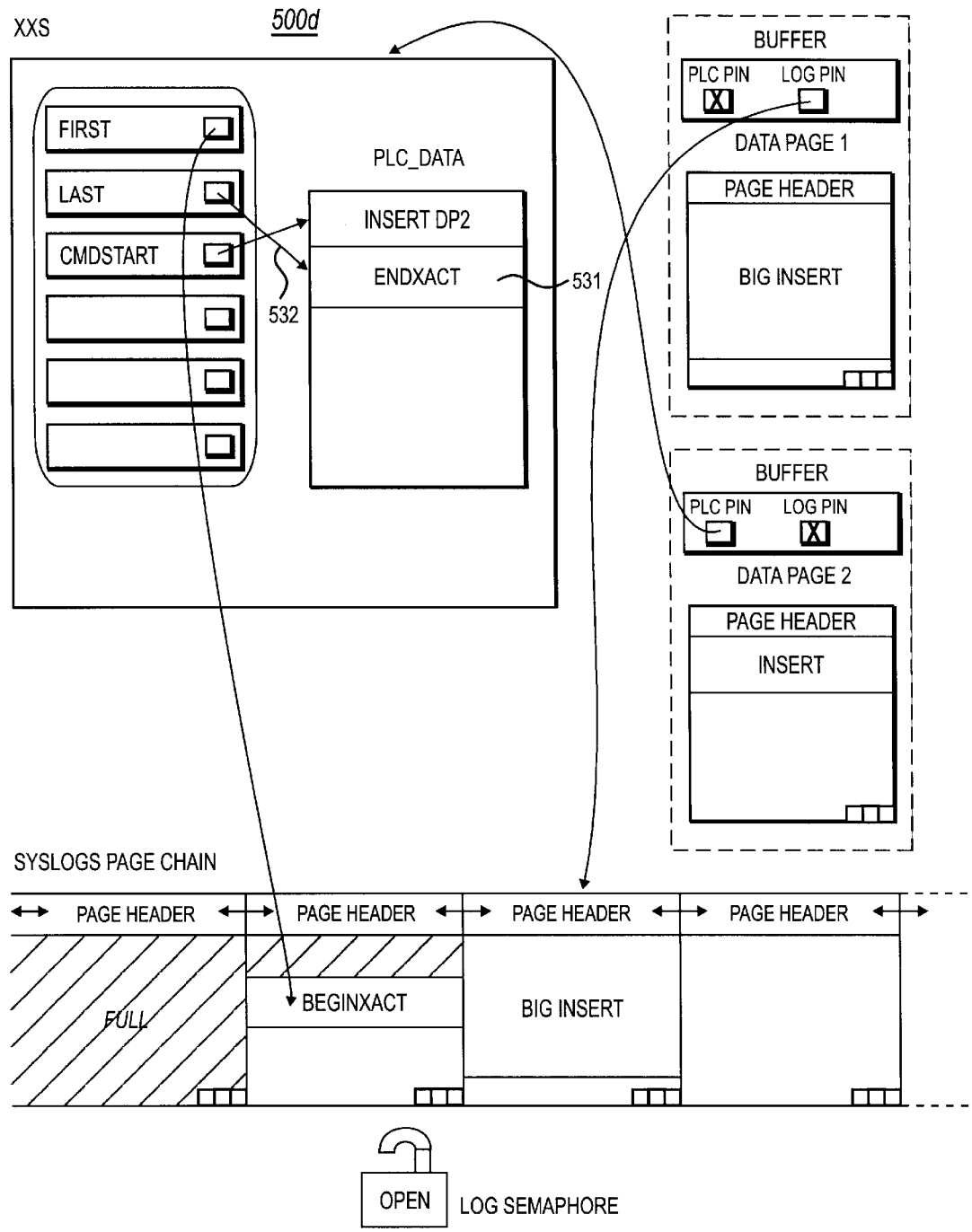
Figure 5E:
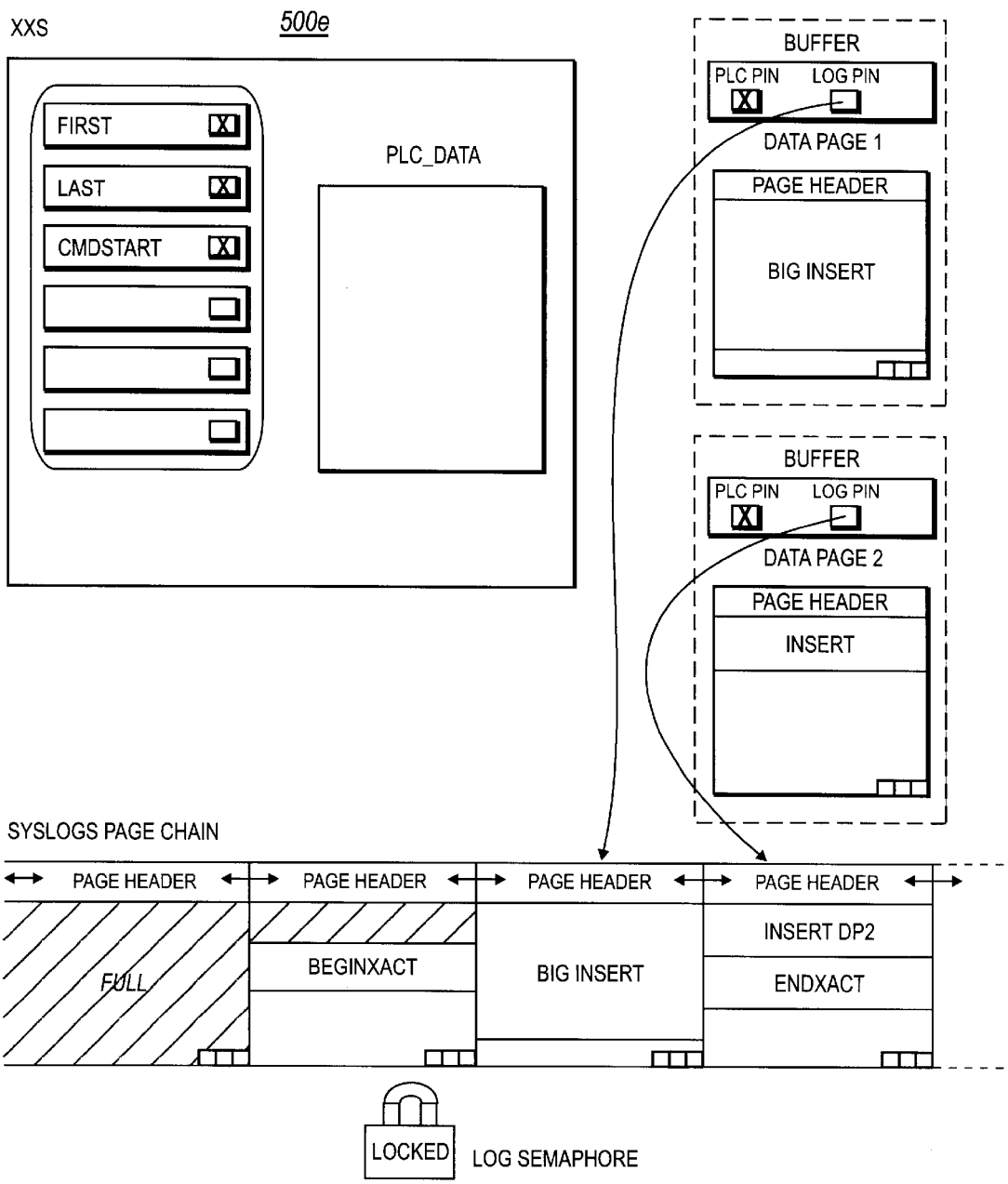

Continuing with the example, FIG. 5D illustrates the state of the logging data structures (500d) at the point when the transaction attempts to commit (i.e., COMMIT SQL command statement). The corresponding ENDXACT log record is appended to the private log cache, as indicated at 531. As this represents the last log record, the "last" marker is set to point to it, as indicated at 532. FIG. 5E illustrates the state of the logging data structures (500e) at the point where all logging records are flushed to the page chain. As illustrated in the figure, both data page buffers are now pinned to the log page chain.

3. EXAMPLE #3

FIGS. 6A–E illustrate processing of the logging data structures for the scenario where a data page used by a pending transaction is written from memory, for instance, when the page is written from memory by a virtual memory manager, because the transaction is inactive. Because the data page is being written to disk, it is necessary for the buffer for that page to undergo the unpinned process. The private log cache itself operates under control of a lock so that another transaction, if appropriate, can lock the structure and flush the cache (e.g., for memory management purposes).

Figure 6A:
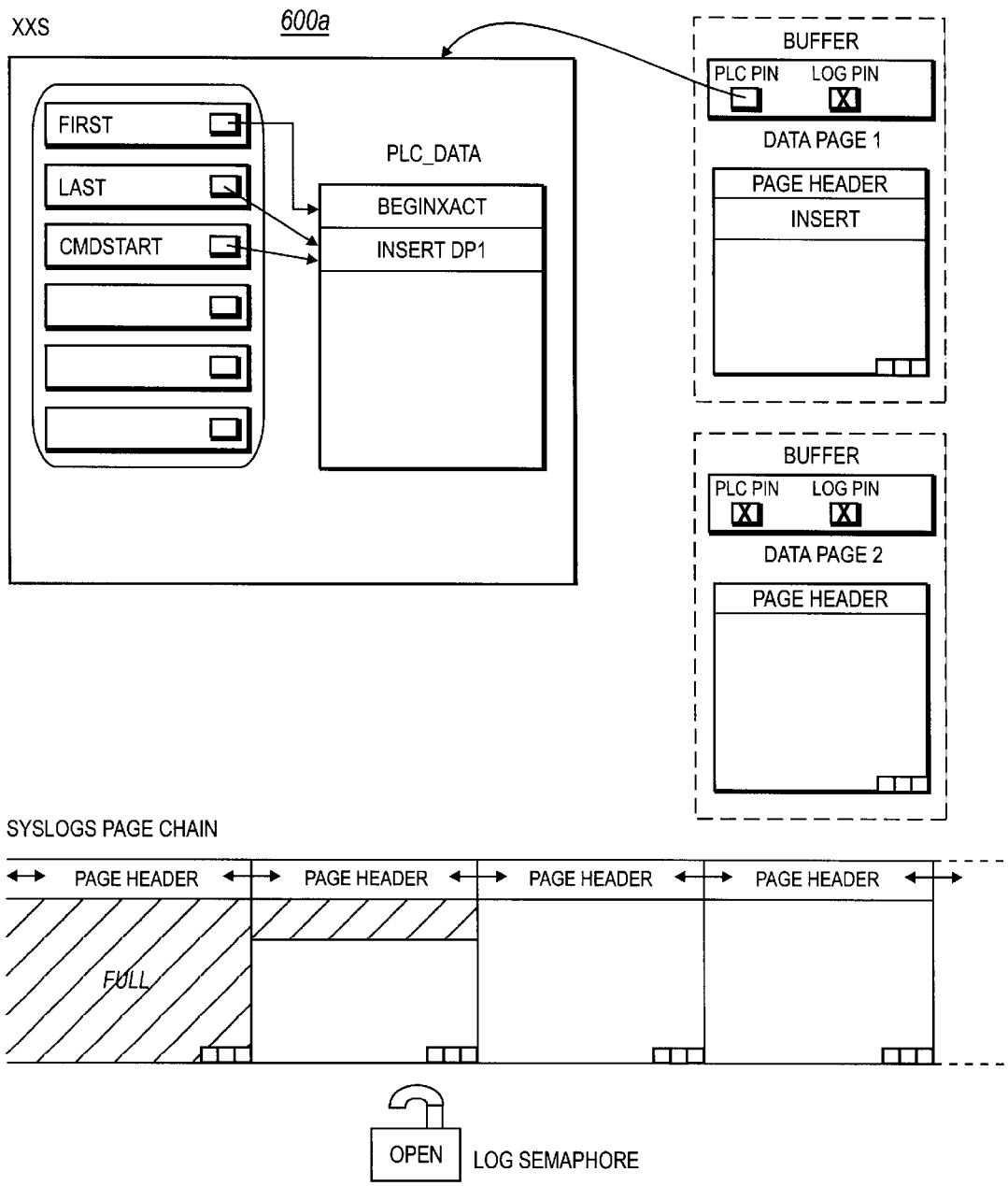
FIGS. 6A–E are block diagrams of the logging data structures of the present invention illustrating processing in the system for an example where a data page used by a pending transaction is written to disk (e.g., by a virtual memory manager).
Figure 6B:
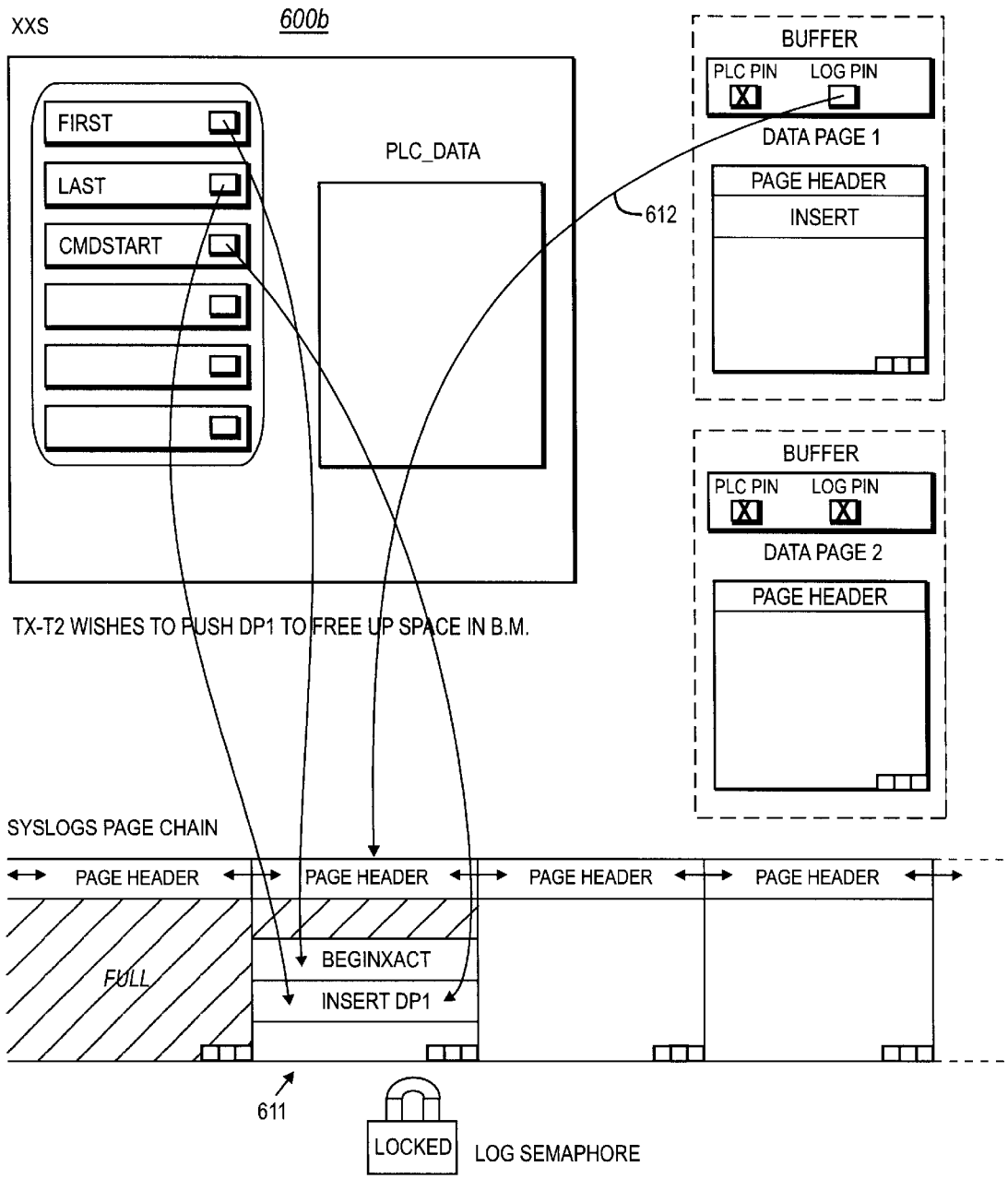

As shown for logging data structures 600a in FIG. 6A, the buffer for data page 1 is pinned to the private log cache, since log records reside there. Suppose now that the transaction using the page, transaction T1, is inactive for some period of time, thus, causing the system to swap out the page. The act of unpinning of the page's buffer causes the private log cache to flush the log records to the log page chain. This is illustrated for the logging data structures (now 600b) in FIG. 6B. As shown at 611, the log records have been copied to the log page chain; the private log cache is now empty. Accordingly, the markers are updated (with RID values) for referencing their respective log records as they reside in the log page chain. Finally, FIG. 6B indicates that the buffer for data page 1 is now pinned to a log page, as indicated at 612.

Figure 6C:
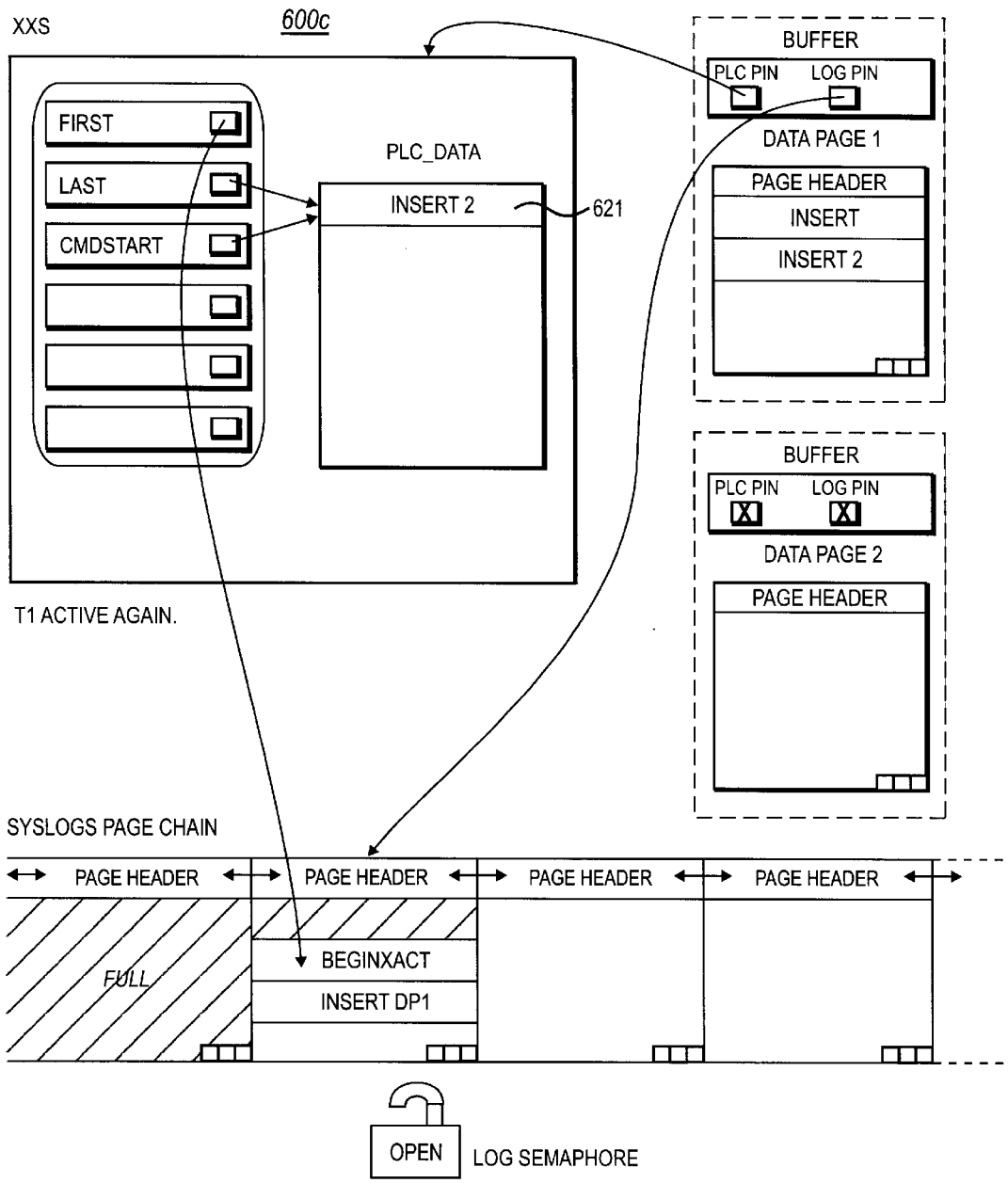

FIG. 6C illustrates logging data structures (600c) when the transaction T1 again resumes activity. Note here that the log records are not brought back into the private log cache. Instead, they are simply left in the log page chain. As the transaction continues, however, new log records are posted to the private log cache, such as the log record at 621 indicating a new insert on the data page.

Figure 6D:
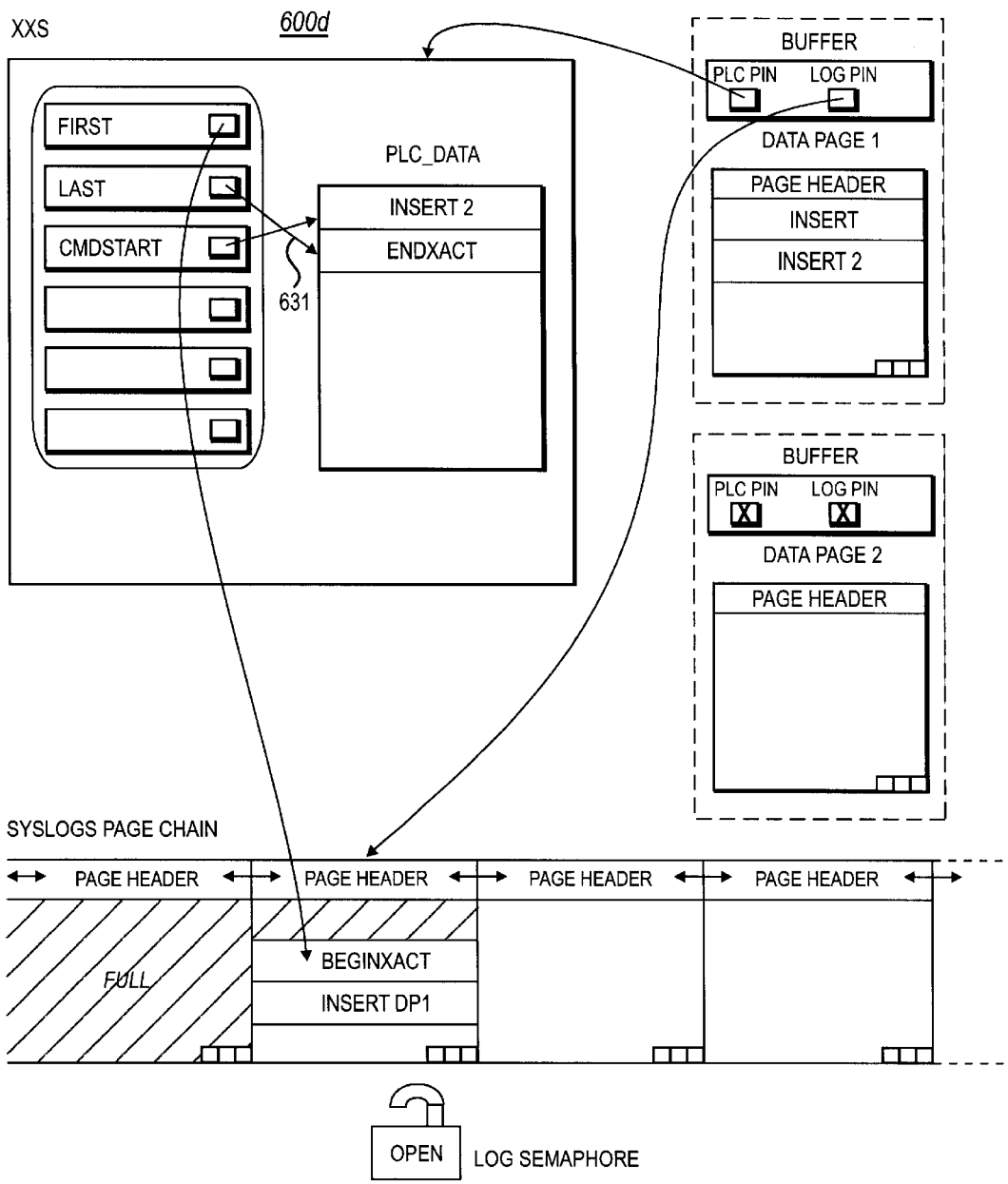
Figure 6E:
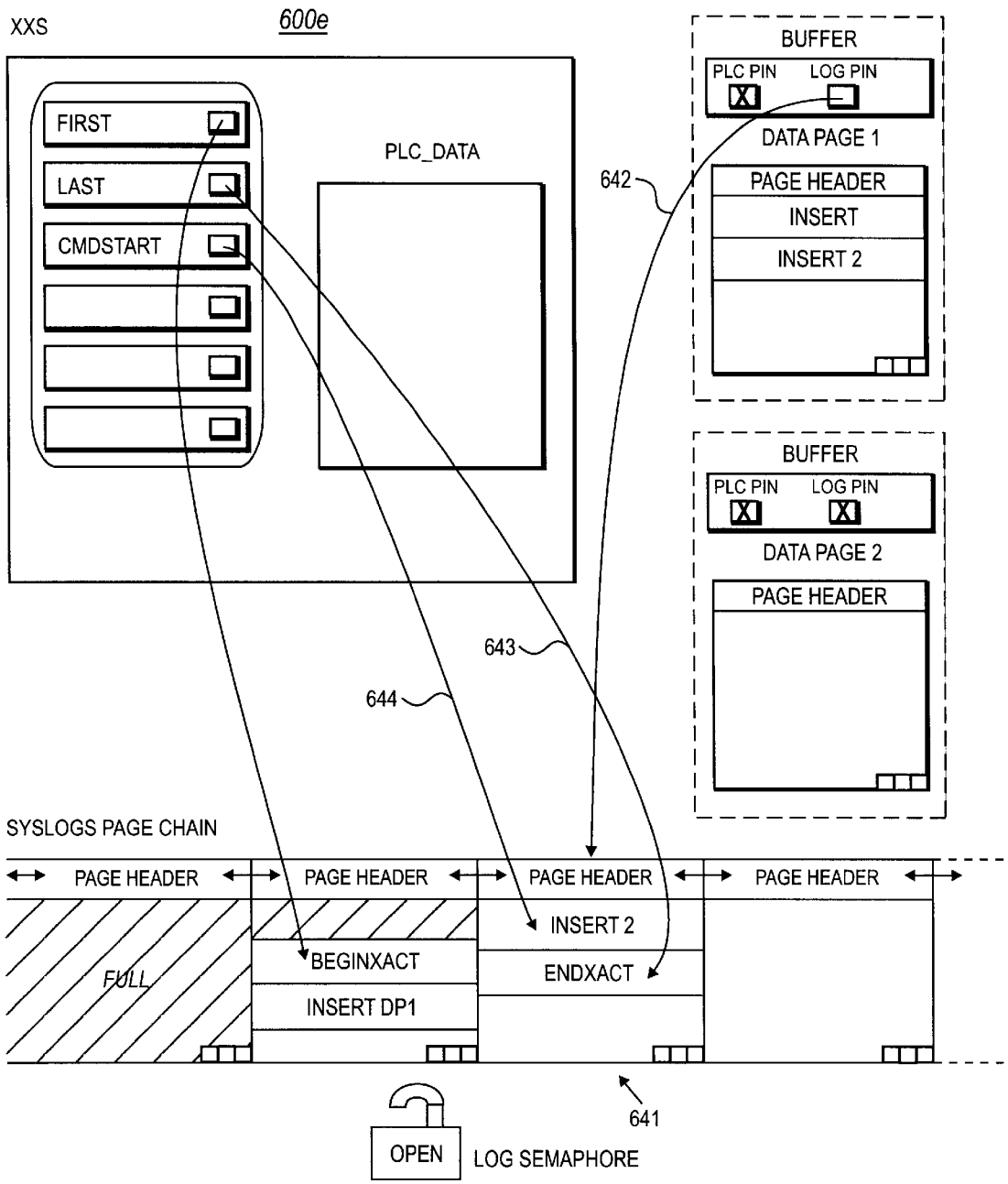

FIG. 6D illustrates the state of logging data structures (600d) at the point when the transaction is to commit. Now, the "last" marker is updated to point to the ENDXACT log record, as indicated at 631. The system is now ready to flush the log records. This is illustrated in FIG. 6E, for logging data structures 600e. Specifically, all remaining log records have been flushed to the log page chain, as indicated at 641. The buffer for data page 1 has been unpinned from the private log cache and pinned to the log page chain, as indicated at 642. Finally, the XLRMARKERs which pointed to log records in the private log cache are updated (with RID values), as indicated at 643 and 644, for pointing to the log records as they reside in the log page chain.

4. EXAMPLE #4

Figure 7A:
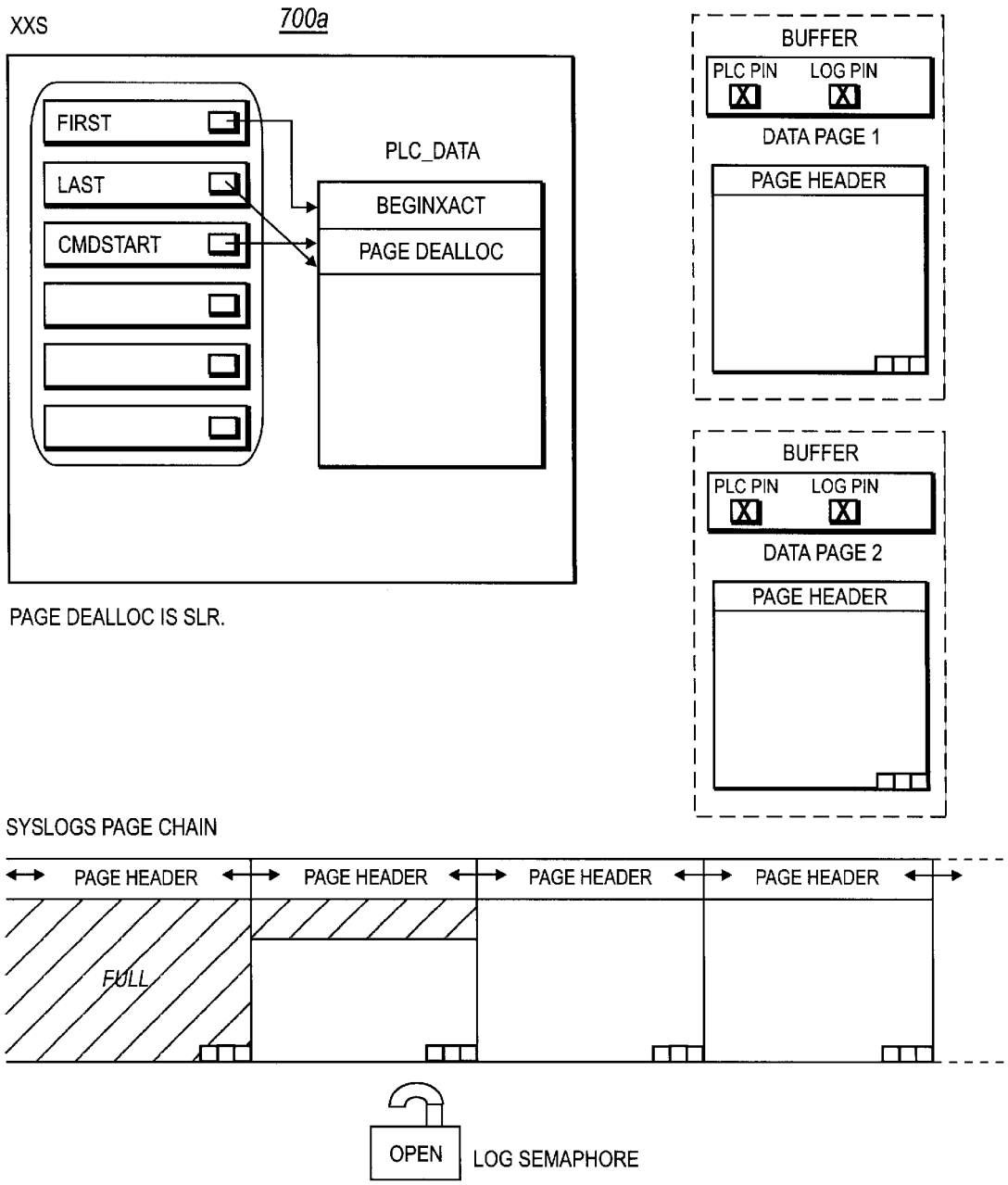
FIGS. 7A–C are block diagrams of the logging data structures of the present invention illustrating system processing in the instance where a client request immediate flushing of log records.
Figure 7B:
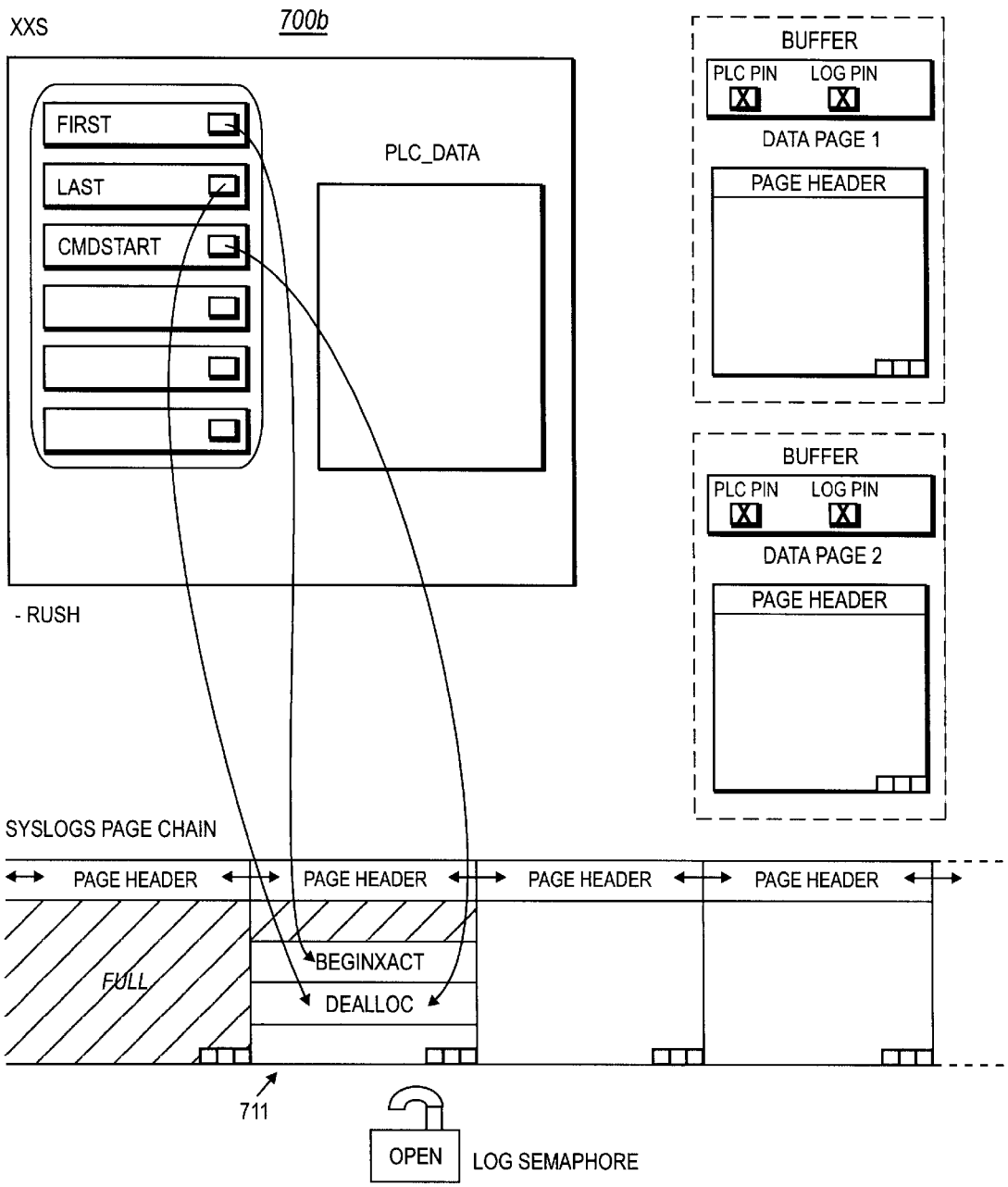
Figure 7C:
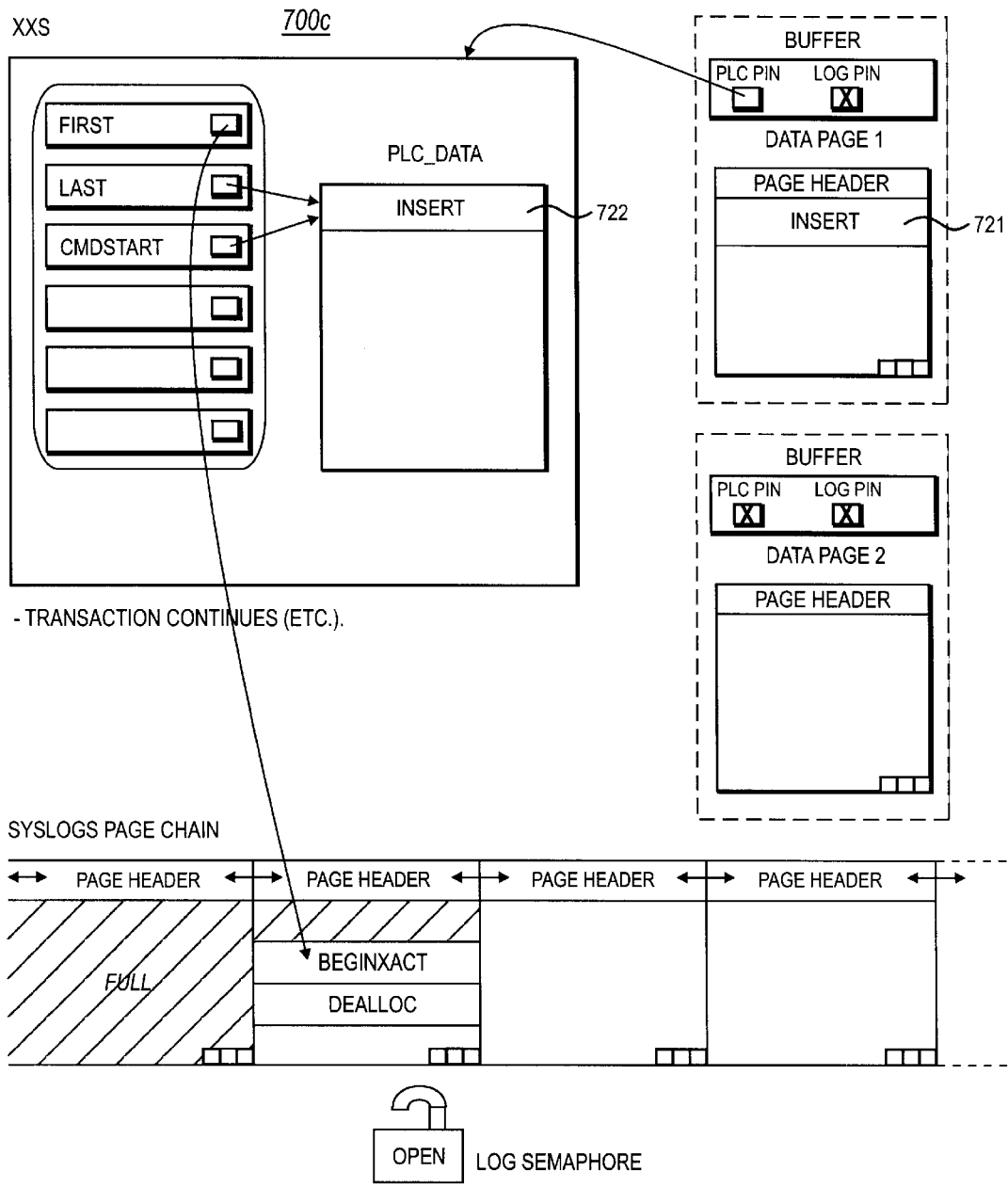

FIGS. 7A–C illustrate a final scenario where a client requests immediate flushing of log records. This request is referred to herein as a "single log record" (SLR) transaction. A common example of such a transaction occurs during a request for page deallocation (e.g., occurring in response from a DELETE FROM SQL statement).

FIG. 7A illustrates the state of logging data structures (700a) at the point where page deallocation is requested. As shown, the private log cache stores a "begin transaction" log record and a "page deallocation" log record. The XLR-MARKERs point to appropriate log records, in the manner previously described. Next, flushing of the log records to the log page chain occurs. This is illustrated in FIG. 7B, for logging data structures 700b. The log records have been flushed to the log page chain, as indicated as 711. The XLRMARKERs have been updated to now point to the log records as they reside in the log page chain.

Even though an event has occurred which requires immediate flushing of log records, the private log cache accommodates the scenario and then continues on supporting the transaction. As illustrated in FIG. 7C for logging data structures 700c, data has been inserted into data page 1, shown at 721, thus leading to an insert log record being appended to the private log cache, as indicated at 722. The "last" marker and the "command start" marker point to this new log record. The "first" marker, on the other hand, continues to point to the BEGINXACT log record, as it resides in the log page chain. This example serves to illustrate, therefore, that the transaction continues to use the private log cache despite the fact that certain log records associated with the transaction have already been flushed.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a database system for processing a sequence of database changes as a transaction, said database system capable of processing multiple transactions from concurrently connected clients, a method for posting changes occurring in the database system to a transaction log in a manner that reduces contention among transactions for the transaction log, the method comprising:

receiving multiple transactions, each transaction being received as a sequence of SQL commands from a given client requesting changes to a database;

for each change to the database for a given transaction of a given client, creating a log record describing the change and storing the log record in a private log cache for that given transaction, said private log cache for storing log records which have been created for that given transaction but not yet posted to the transaction log, so that each transaction is associated with its own private log cache; and upon receiving from a particular client for a particular transaction one of the SQL commands which commits changes to the database, performing substeps of:
 (i) flushing the private log cache for that particular transaction to the transaction log, and
 (ii) flushing the transaction log to disk, wherein said log records are flushed to the transaction log before any corresponding data pages affected by said given task are flushed to disk;

wherein at least one change includes a modification to a data page stored in memory and wherein said data page is pinned to said private log cache such that said data page can only be written to disk after its corresponding log records for the modification are flushed from the private log cache to the transaction log and then flushed from the transaction log to disk.

2. The method of claim 1, wherein each transaction includes an SQL "BEGIN TRANSACTION" command and an SQL "COMMIT" command.

3. The method of claim 2, wherein the private log cache is flushed to the transaction log upon receipt of the SQL "COMMIT" command.

4. The method of claim 1, wherein said log records are only appended to one end of the transaction log.

5. The method of claim 1, wherein said substep (i) includes:

acquiring exclusive access to the transaction log prior to flushing the private log cache to the transaction log; and relinquishing exclusive access to the transaction log after flushing the private log cache to the transaction log.

6. The method of claim 5, wherein said step of acquiring exclusive access includes acquiring a log semaphore which grants exclusive access for the transaction log to a single task at a time.

7. The method of claim 1, wherein said transaction log is sequentially arranged so that changes which occur in the system are represented in the transaction log in the sequence in which they occur.

8. The method of claim 1, wherein at least one change comprises a modification to a data page stored in memory, and wherein the method further comprises:

after flushing the transaction log to disk, flushing said data page to disk.

9. The method of claim 1, wherein a plurality of transactions are executing in the system at a given point in time, and wherein a plurality of private log caches are created, one for each transaction currently executing in the system.

10. In a database system having a transaction log which is shared among multiple transactions, a method for logging transactions which occur in the system in a manner which reduces contention for the transaction log, the method comprising:

allocating in memory a private log cache for each transaction so that log records for a given transaction can first be stored separately from log records of other transactions before posting to the transaction log, each private log cache restricted to storing multiple log records for a single transaction;

receiving commands specifying a particular transaction to be executed by the system;

in response to receipt of said commands, creating in the private log cache for the particular transaction particular log records describing the particular transaction;

prior to committing any changes specified by the particular transaction, posting the particular log records to the transaction log by copying the particular log records from the private log cache for the particular transaction to the transaction log;

if the particular log records can be successfully posted to the transaction log and the transaction log can be flushed to disk, completing execution of the particular transaction by committing any changes specified by the particular transaction;

flushing the transaction log to disk before said particular data page is flushed to disk;

wherein the particular transaction specifies a change which affects a particular data page, and wherein said posting step comprises posting to the transaction log any log records having log information representing the change which affects said particular data page, said posting step being performed before said particular data page is flushed to disk; and wherein each data page is associated with a log pin which points to a place in the transaction log where the transaction log must be flushed to disk before the data page itself is written to disk.

11. The method of claim 10, wherein access to the transaction log is controlled through use of a log semaphore, and wherein said posting step includes:

acquiring the log semaphore so that the particular log records can be posted with exclusive access to the transaction log.

12. The method of claim 10, wherein the particular log records are posted to the transaction log when the private log cache fills to capacity.

13. The method of claim 10, wherein the particular log records are posted to the transaction log in response to the system receiving a command to commit all changes specified by the particular transaction.

14. The method of claim 13, wherein said command to commit all changes Comprises an SQL "COMMIT" command.

15. The method of claim 10, further comprising:

attempting to flush the particular data page to disk; and rolling back the transaction if the particular data page cannot be successfully flushed to disk.

16. The method of claim 15, wherein said rolling back step comprises:

using the particular log records for the transaction to undo any changes for the transaction, so that the system can be restored to its state that existed just prior to undertaking execution of the transaction.

* * * * *